United States Patent
Yan

(10) Patent No.: US 11,825,136 B2
(45) Date of Patent: Nov. 21, 2023

(54) VIDEO TRANSCODING METHOD AND APPARATUS

(71) Applicant: HUAWEI TECHNOLOGIES CO., LTD., Guangdong (CN)

(72) Inventor: Wei Yan, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 2 days.

(21) Appl. No.: 17/631,403

(22) PCT Filed: Jul. 21, 2020

(86) PCT No.: PCT/CN2020/103365
§ 371 (c)(1),
(2) Date: Jan. 28, 2022

(87) PCT Pub. No.: WO2021/017958
PCT Pub. Date: Feb. 4, 2021

(65) Prior Publication Data
US 2022/0279225 A1  Sep. 1, 2022

(30) Foreign Application Priority Data
Jul. 30, 2019 (CN) .......................... 201910711337.6

(51) Int. Cl.
H04N 21/2343 (2011.01)
H04N 21/845 (2011.01)

(52) U.S. Cl.
CPC . *H04N 21/234336* (2013.01); *H04N 21/8455* (2013.01); *H04N 21/8456* (2013.01)

(58) Field of Classification Search
CPC ....... H04N 21/234336; H04N 21/8455; H04N 21/8456; H04N 21/234363;
(Continued)

(56) References Cited

U.S. PATENT DOCUMENTS 8,468,572 B2   6/2013  Liu et al.
2001/0051958 A1*  12/2001  deVries ................... G06F 17/21
(Continued)

FOREIGN PATENT DOCUMENTS

CN        104104971 A    10/2014
CN        105979404 A     9/2016
(Continued)

OTHER PUBLICATIONS

Dong Yu et al: "A Generic Distributed Scheduling Algorithm forFrame Rate up Convert Video Transcoding",2018 IEEE International Symposium on BROADBANDD3 Multimedia Systems and Broadcasting (BMSB), IEEE, Jun. 6, 2018 (Jun. 6, 2018), pp. 1-5, XP033386128.
(Continued)

*Primary Examiner* — Anthony Bantamoi
(74) *Attorney, Agent, or Firm* — HUAWEI TECHNOLOGIES CO., LTD.

(57) ABSTRACT

This disclosure relates to the field of video processing technologies. The method includes: receiving, by the media asset subsystem, an indication message, where the indication message is used to indicate to add a medium file corresponding to a second video stream to the target media asset medium; obtaining a content source medium of the target video based on the indication message; sending the content source medium of the target video to a transcoding subsystem, so that the transcoding subsystem generates the medium file corresponding to the second video stream, where first information of the second video stream is the same as first information of the first video stream, and the first information includes whether a key frame is an IDR frame and location information of the key frame; and receiving the medium file that corresponds to the second video stream and that is sent by the transcoding subsystem.

26 Claims, 11 Drawing Sheets

(58) Field of Classification Search
CPC .......... H04N 21/23439; H04N 21/235; H04N 21/242; H04N 21/816; H04N 21/85406; H04N 21/440236; H04N 21/440263
See application file for complete search history.

(56) References Cited

U.S. PATENT DOCUMENTS

2012/0201310 A1* 8/2012 Yamagishi .............. H04N 7/26
2015/0281751 A1 10/2015 Nemiroff et al.

FOREIGN PATENT DOCUMENTS

| CN | 108989885 A | 12/2018 |
| CN | 110602555 A | 12/2019 |
| WO | 2019024919 A1 | 2/2019 |

OTHER PUBLICATIONS

ITU-T H.264(Jun. 2019), Series H: Audiovisual and Multimedia Systems, Infrastructure of audiovisual services-Coding of moving video, Advanced video coding for generic audiovisual services, total 836 pages.
ITU-T H.265(Jun. 2019), Series H: Audiovisual and Multimedia Systems, Infrastructure of audiovisual services-Coding of moving video,High efficiency video coding, total 696 pages.

* cited by examiner

VIDEO TRANSCODING METHOD AND APPARATUS

This application is a national stage of International Application No. PCT/CN2020/103365, filed on Jul. 21, 2020, which claims priority to Chinese Patent Application No. 201910711337.6, filed on Jul. 30, 2019 Both of the aforementioned applications are hereby incorporated by reference in their entireties.

TECHNICAL FIELD

This disclosure relates to the field of video processing technologies, and in particular, to a video transcoding method and apparatus.

BACKGROUND

With the development of video services, technologies such as higher definition, high-dynamic range (HDR), and image detail display have been applied to the field of video processing technologies. In addition, types of terminals supporting video playing are increasing, and users have higher requirements on pictures during video playing. Therefore, a video operator usually needs to add a medium file corresponding to one or more channels of bitstreams to a media asset medium in which a medium file corresponding to the bitstream has been stored, to meet a watching requirement of a user.

Currently, a variable bit rate (VBR) playing technology is generally used, so that when playing a video, a terminal can dynamically select, based on a bandwidth condition of a network, a most suitable bitstream for playing. However, when a medium file corresponding to one or more bit streams needs to be added to a video, to ensure continuity of video playing by the terminal, it is generally necessary to discontinue medium files corresponding to all existing bit streams in a media asset medium to which the medium file corresponding to the newly added bit streams belong, re-transcode a content source film of the video to generate medium files corresponding to all bit streams in the media asset medium (including medium files corresponding to the existing bitstreams and medium files corresponding to the newly added bitstreams), and then re-release the medium files. In this way, the medium file corresponding to the existing bitstreams and the medium files corresponding to the newly added bitstreams in the media asset medium are generated through re-transcoding, which increases resource consumption and transcoding costs, and leads to long transcoding time and low release efficiency.

SUMMARY

Embodiments of this disclosure provide a video transcoding method and apparatus, which help reduce transcoding resource consumption and transcoding costs, shorten transcoding time, and improve release efficiency.

According to a first aspect, an embodiment of this disclosure provides a video transcoding method, applied to a media asset subsystem. The media asset subsystem stores a target media asset medium of a target video, and the target media asset medium includes a medium file corresponding to a first bitstream. The method includes: The media asset subsystem receives an indication message. The indication message is used to indicate to add a medium file corresponding to a second bitstream to the target media resource medium. The media asset subsystem obtains a content source film of the target video based on the indication message. Then, the media asset subsystem sends the content source film of the target video to a transcoding subsystem. The content source film of the target video is used by the transcoding subsystem to generate a medium file corresponding to the second bitstream, first information of the second bitstream is the same as first information of the first bitstream, and the first information includes location information of a key frame and whether the key frame is an IDR frame. Finally, the media asset subsystem receives the medium file that corresponds to the second bitstream and that is sent by the transcoding subsystem. In this technical solution, only the medium file corresponding to the second bitstream is generated through transcoding, and the content source film of the video does not need to be re-transcoded to generate medium files corresponding to all bitstreams in the media asset medium (including a medium file of an existing bitstream and a medium file of a newly added bitstream), which helps reduce transcoding resource consumption and transcoding cost, shorten transcoding time, and improve release efficiency.

Optionally, the first information further includes: at least one of GOP description information, fragment description information, and segment description information. When the first information includes the GOP description information and the fragment description information, it helps implement continuity of video playing during bitstream switching of a player. When the first information includes the segment description information, it helps implement simultaneous transcoding by a plurality of transcoding devices, thereby improving transcoding efficiency.

In an optional implementation, the method further includes: The media asset subsystem obtains the first information of the first bitstream based on the indication message, and the media asset subsystem sends the first information of the first bitstream to the transcoding subsystem. The media asset subsystem obtains the first information of the first bitstream and sends the first information to the transcoding subsystem, so that the transcoding subsystem can directly transcode the content source film of the target video into the medium file corresponding to the second bitstream based on the first information of the first bitstream, and the first information of the second bitstream is the same as that of the first bitstream, thereby implementing continuity of video picture playing during bitstream switching on a player.

In an optional implementation, the method further includes: The media asset subsystem obtains the medium file corresponding to the first bitstream based on the indication message. The media asset subsystem sends the medium file corresponding to the first bitstream to the transcoding subsystem. The medium file corresponding to the first bitstream is used by the transcoding subsystem to generate the first information of the first bitstream. The transcoding system generates the first information of the first bitstream based on the medium file corresponding to the first bitstream, so that the first information of the second bitstream generated through transcoding is the same as the first information of the first bitstream, thereby implementing continuity of video picture playing during bitstream switching on a player.

In an optional implementation, the method further includes: The media asset subsystem receives the first information that is of the first bitstream and that is sent by the transcoding subsystem, and stores the first information of the first bitstream, so that when a medium file of a newly added bitstream needs to be generated through transcoding next time, the media asset subsystem can directly send the first information to the transcoding subsystem, so that the transcoding subsystem may directly transcode the content source film of the target video based on the first information, without parsing the medium file corresponding to the first bitstream again, thereby saving computing resources of the transcoding subsystem.

In an optional implementation, the method further includes: The media asset subsystem obtains a first index file of the target media asset medium based on the indication message. The first index file includes second information of the first bitstream. The media asset subsystem receives the second information that is of the second bitstream and that is sent by the transcoding subsystem. The media asset subsystem adds the second information of the second bitstream to the first index file, to obtain a second index file of the target media asset medium. The media asset subsystem may also update the first index file of the target media asset medium to the second index file based on the second information of the second bitstream. Second information of a bitstream (the bitstream may be the first bitstream or the second bitstream) is information used to describe a feature of the bitstream. In this way, file transmission between the media asset subsystem and the transcoding subsystem can be reduced, thereby saving network transmission resources.

In an optional implementation, the method further includes: The media asset subsystem obtains a first index file of the target media asset medium based on the indication message. The first index file includes second information of the first bitstream. The media asset subsystem sends the first index file to the transcoding subsystem. The first index file is used by the transcoding subsystem to obtain a second index file of the target media asset medium, and the second index file includes the second information of the first bitstream and second information of the second bitstream. Second information of a bitstream (the bitstream may be the first bitstream or the second bitstream) is information used to describe a feature of the bitstream. The media asset subsystem receives the second index file sent by the transcoding subsystem. The media asset subsystem replaces the first index file with the second index file.

In an optional implementation, the method further includes: The media asset subsystem injects the second index file into a content delivery network CDN subsystem based on identification information of the target video. The CDN subsystem stores the first index file, and the second index file is used by the CDN subsystem to update the first index file.

In an optional implementation, after the media asset subsystem receives the medium file that corresponds to the second bitstream and that is sent by the transcoding subsystem, the method further includes: The media asset subsystem injects the medium file corresponding to the second bitstream into the CDN subsystem based on the identification information of the target video.

In an optional implementation, the method further includes: The media asset subsystem sends an update amount of the target media asset medium information to a content management subsystem. The update amount of the target media asset medium information is used by the content management subsystem to update metadata information of the target video. The metadata information of the target video is updated in the content management subsystem, so that the content management subsystem can provide a download address of the second index file to a terminal player when the terminal player requests to play the target video, the terminal player can obtain the second index file from the CDN subsystem based on the download address of the second index file, and obtain a medium file corresponding to a related bitstream based on a download URL address of each bitstream in the second index file, and the terminal player selects a medium file corresponding to a proper bitstream in the media asset medium based on a network bandwidth condition to play the video to a user.

According to a second aspect, an embodiment of this disclosure provides a video transcoding method, applied to a transcoding subsystem. The method includes: The transcoding subsystem receives a content source film that is of a target video and that is sent by a media asset subsystem. The media asset subsystem stores a target media asset medium of the target video, and the target media asset medium includes a medium file corresponding to a first bitstream. The transcoding subsystem transcodes the content source film of the target video into a medium file corresponding to a second bitstream, where first information of the second bitstream is the same as first information of the first bitstream, and the first information includes location information of a key frame and whether the key frame is an IDR frame. The transcoding subsystem sends the medium file corresponding to the second bitstream to the media asset subsystem. In this technical solution, the transcoding subsystem generates only the medium file corresponding to the second bitstream through transcoding, without re-transcoding the content source film of the video to generate medium files corresponding to all bitstreams in the media asset medium (including a medium file of an existing bitstream and a medium file of a newly added bitstream), which helps reduce transcoding resource consumption and transcoding cost, shorten transcoding time, and improve release efficiency.

Optionally, the first information further includes: at least one of GOP description information, fragment description information, and segment description information. When the first information includes the GOP description information and the fragment description information, it helps implement continuity of video playing during bitstream switching of a player. When the first information includes the segment description information, it helps implement simultaneous transcoding by a plurality of transcoding devices, thereby improving transcoding efficiency.

In an optional implementation, the method further includes: The transcoding subsystem receives the first information that is of the first bitstream and that is sent by the media asset subsystem. The first information of the first bitstream is received, so that the transcoding subsystem can directly transcode the content source film of the target video based on the first information of the first video stream to generate the medium file corresponding to the second bitstream, and the first information of the second bitstream is the same as the first information of the first bitstream, thereby implementing continuity of video picture playing during bitstream switching on a player.

In an optional implementation, the method further includes: The transcoding subsystem receives the medium file that corresponds to the first bitstream and that is sent by the media asset subsystem. The transcoding subsystem generates the first information of the first bitstream based on the medium file corresponding to the first bitstream. The transcoding system may alternatively generate the first information of the first bitstream through parsing based on the medium file that corresponds to the first bitstream and that is sent by the media asset subsystem, so that first information of the second bitstream generated through transcoding is the same as the first information of the first bitstream, thereby implementing continuity of video picture playing during bitstream switching on a player.

In an optional implementation, the method further includes: The transcoding subsystem sends the first information of the first bitstream to the media asset subsystem, so that when a medium file corresponding to a newly added bitstream needs to be generated through transcoding next time, the media asset subsystem can directly send the first information to the transcoding subsystem, so that the transcoding subsystem may directly transcode the content source film of the video based on the first information, without parsing the medium file corresponding to the first bitstream again, thereby saving computing resources of the transcoding subsystem.

In an optional implementation, the method further includes: The transcoding subsystem generates second information of the second bitstream, and sending the second information of the second bitstream to the media asset subsystem. The second information of the second bitstream is used by the media asset subsystem to update a first index file of the target media asset medium to obtain a second index file of the target media asset medium, the first index file includes second information of the first bitstream, and the second index file includes second information of the first bitstream and the second information of the second bitstream. Second information of a bitstream (the bitstream may be the first bitstream or the second bitstream) is information used to describe a feature of the bitstream. The media asset subsystem has a function of updating the first index file of the target media asset medium to the second index file based on the second information of the second bitstream, so that file transmission between the media asset subsystem and the transcoding subsystem can be reduced, thereby saving network transmission resources.

In an optional implementation, the method further includes: The transcoding subsystem receives a first index file that is of the target media asset medium and that is sent by the media asset subsystem. The first index file includes second information of the first bitstream. The transcoding subsystem generates second information of the second bitstream, and adding the second information of the second bitstream to the first index file, to obtain a second index file. Second information of a bitstream (the bitstream may be the first bitstream or the second bitstream) is information used to describe a feature of the bitstream. The transcoding subsystem sends the second index file to the media asset subsystem. The second index file is used by the media asset subsystem to replace the first index file.

According to a third aspect, an embodiment of this disclosure provides a media asset subsystem. The media asset subsystem may be configured to perform any method provided in any one of the first aspect or the possible designs of the first aspect.

In an optional design, function modules of the apparatus may be obtained through division according to the method provided in any one of the first aspect or the possible designs of the first aspect. For example, the function modules may be obtained through division corresponding to functions, or two or more functions may be integrated into one processing module.

In an optional design, the media asset subsystem may include at least one memory and at least one processor. The at least one memory is configured to store a computer program, and the at least one processor is configured to invoke the computer program, to perform the method provided in any one of the first aspect or the possible designs of the first aspect.

According to a fourth aspect, an embodiment of this disclosure provides a video transcoding apparatus. The apparatus may include a memory and a processor. The memory is configured to store a computer program, and the processor is configured to invoke the computer program, to perform some or all of the steps in the method provided in any one of the first aspect or the possible designs of the first aspect. For example, the apparatus may be a chip or a device in a media asset subsystem.

According to a fifth aspect, an embodiment of this disclosure provides a transcoding subsystem. The transcoding subsystem may be configured to perform any method provided in any one of the second aspect or the possible designs of the second aspect.

In an optional design, function modules of the apparatus may be obtained through division according to the method provided in any one of the second aspect or the possible designs of the second aspect. For example, the function modules may be obtained through division corresponding to functions, or two or more functions may be integrated into one processing module.

In an optional design, the transcoding subsystem may include at least one memory and at least one processor. The at least one memory is configured to store a computer program, and the at least one processor is configured to invoke the computer program, to perform the method provided in any one of the second aspect or the possible designs of the second aspect.

According to a sixth aspect, an embodiment of this disclosure provides a video transcoding apparatus. The apparatus may include a memory and a processor. The memory is configured to store a computer program, and the processor is configured to invoke the computer program, to perform some or all of the steps in the method provided in any one of the second aspect or the possible designs of the second aspect. For example, the apparatus may be a chip or a device in a transcoding subsystem.

According to a seventh aspect, an embodiment of this disclosure provides a computer-readable storage medium, for example, a non-transient computer-readable storage medium. Computer programs (or instructions) are stored on the computer-readable storage medium. When the computer programs (or instructions) are run on a computer, the computer is enabled to perform any method provided in any one of the first aspect or the possible designs of the first aspect.

According to an eighth aspect, an embodiment of this disclosure provides a computer-readable storage medium, for example, a non-transient computer-readable storage medium. Computer programs (or instructions) are stored on the computer-readable storage medium. When the computer programs (or instructions) are run on a computer, the computer is enabled to perform any method provided in any one of the second aspect or the possible designs of the second aspect.

According to a ninth aspect, an embodiment of this disclosure provides a computer program product. When the computer program product is run on a computer, any method provided in any one of the first aspect or the possible designs of the first aspect is performed.

According to a tenth aspect, an embodiment of this disclosure provides a computer program product. When the computer program product is run on a computer, any method provided in any one of the second aspect or the possible designs of the second aspect is performed.

According to an eleventh aspect, an embodiment of this disclosure provides a video transcoding system. The system includes a media asset subsystem and a transcoding subsystem. The media asset subsystem may be any media asset subsystem provided in any one of the third aspect or the possible designs of the third aspect. The transcoding subsystem may be any transcoding subsystem provided in any one of the fifth aspect or the possible designs of the fifth aspect.

It may be understood that any one of the apparatus, the computer storage medium, the computer program product, the chip system, or the like provided above may be applied to a corresponding method provided above. Therefore, for beneficial effects that can be achieved by the apparatus, the computer storage medium, the computer program product, the chip system, or the like, refer to the beneficial effects of the corresponding method. Details are not described herein again.

DESCRIPTION OF EMBODIMENTS

To help better understand the technical solutions in the embodiments of the present invention, the following first describes some concepts of the technical solutions briefly.

(1) Bitstream and Medium File Corresponding to the Bitstream

Figure 1:
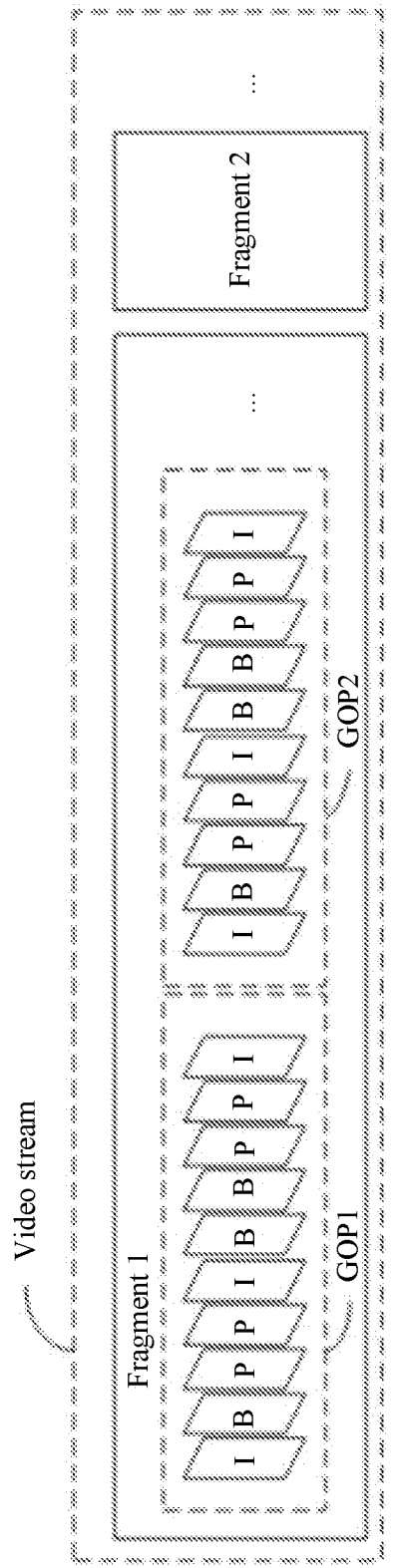
FIG. 1 is a schematic diagram of a structure of a bitstream according to an embodiment of this disclosure.

FIG. 1 is a schematic diagram of a structure of a bitstream. One bitstream includes one or more fragments. Durations of different fragments in a same bitstream may be the same or different. A fragment may have a duration ranging from 2 seconds to 10 seconds, or the like. One fragment includes one or more groups of pictures (GOP). One GOP includes one or more consecutive frames of pictures. Pictures in a GOP can be classified into an I frame (also referred to as a key I frame), a P frame, and a B frame. The key I frame is an intra-coded frame, the P frame is a forward-predicted frame, and the B frame is a bidirectional interpolated frame. The P frame and the B frame record change information relative to the key I frame. It is defined in the digital video encoding format H.264 that one GOP includes one or more key I frames, and the first key I frame in each GOP is an instantaneous decoder refresh (IDR) frame.

Different streams have different attributes. Attributes of the bitstream may include an encapsulation protocol, an encoding format, a resolution, and a bit rate. Optionally, the attributes of the bitstream may further include whether an HDR is supported, and the like. For ease of description, the embodiments of this disclosure are all described by using an example in which the attributes of the bitstream include the encapsulation protocol, the encoding format, the resolution, the bit rate, and whether the HDR is supported. A unified description is provided herein and details are not described below again.

For example, the encapsulation protocol of the bitstream may include: a dynamic adaptive streaming over HTTP (DASH) protocol, an HTTP live streaming (HLS) protocol, and the like. The HTTP is short for hypertext transfer protocol (hypertext transfer protocol). The encoding format of the bitstream may include H.265, H.264, and the like. The resolution of the bitstream may include 480P, 1080P, 4K, and the like. The bit rate of the bitstream may include: 2.5 megabits per second (megabits per second, Mbps), 3.5 Mbps, and the like.

The medium file corresponding to the bitstream refers to a file obtained by encapsulating the bitstream in a file format. For example, a file format for a bitstream encapsulated by the DASH protocol is a moving picture experts group 4 (MP4) format formulated by the moving picture experts group, and a file format for a bitstream encapsulated by the HLS protocol is a UTF-8 moving picture experts group audio layer 3 uniform resource locator (M3U8) format.

Figure 1A:
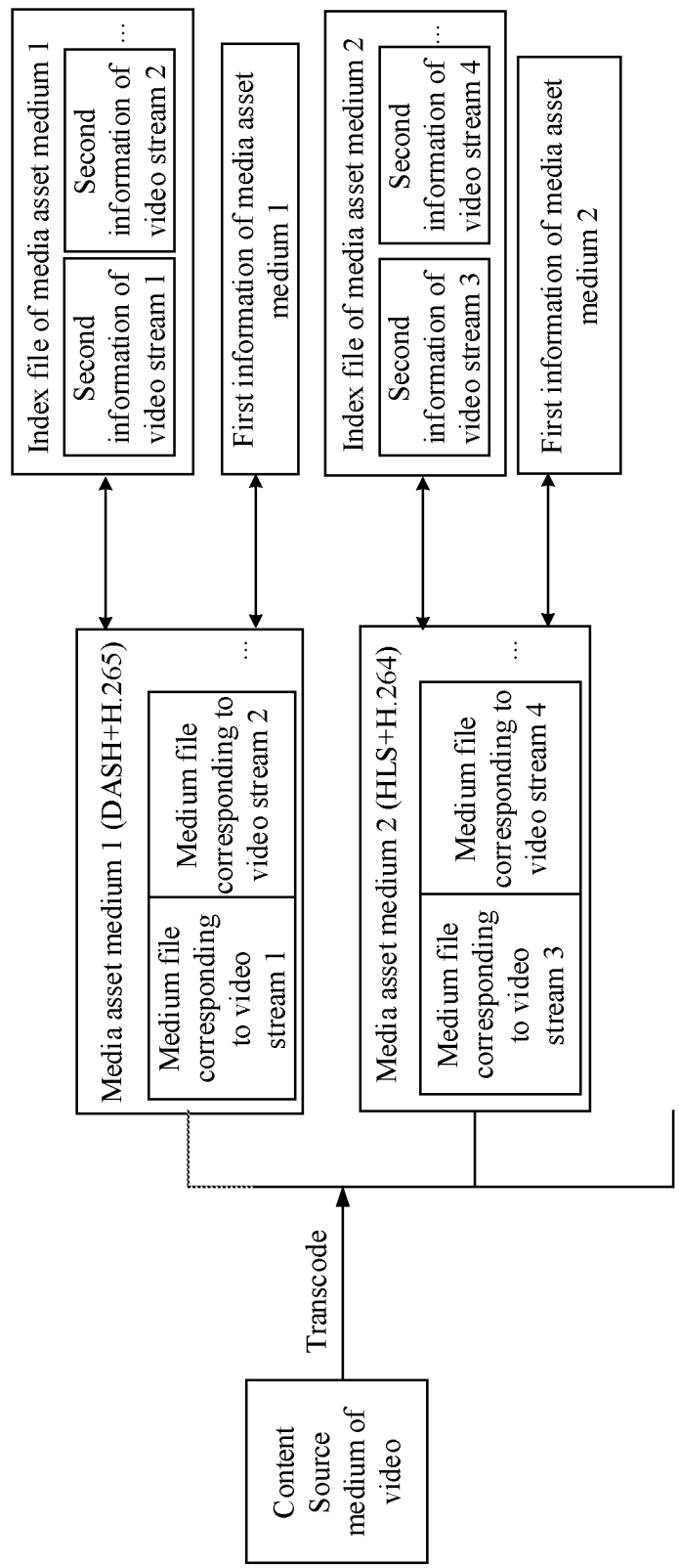
FIG. 1A is a schematic diagram of a relationship between second information of a bitstream, a media asset medium, an index file of the media asset medium, and first information of the bitstream.

One or more medium files corresponding to one or more bitstreams may be obtained by transcoding a content source film of one video. FIG. 1A is a schematic diagram of a relationship between a content source film of a video and a medium file corresponding to a bitstream. A medium file corresponding to the bitstream 1, a medium file corresponding to the bitstream 2, and the like may be obtained by transcoding the content source chip of the video.

It should be noted herein that in this disclosure, the medium file corresponding to the bitstream has a same meaning as the medium file of the bitstream. For example, as shown in FIG. TA, the medium file corresponding to the bitstream 1 is the medium file of the bitstream 1.

(2) Second Information of the Bitstream

The second information of the bitstream is information used to describe a feature of the bitstream, and may also be referred to as description information of the bitstream. The second information of the bitstream may include at least one of the following: resolution, encoding format, and download uniform resource locator (URL) information, and the like of the bitstream.

(3) Media Asset Medium

The media asset medium is a set of one or more medium files of one or more streams that are of a same video and that have specific attributes. For example, the specific attribute may be an encapsulation protocol and an encoding format. For another example, the specific attribute may be an encapsulation protocol.

FIG. 1A is a schematic diagram of a relationship between a content source film of a video, a media asset medium, and a medium file of a bitstream. A plurality of media asset mediums such as a media asset medium 1 and a media asset medium 2 are all for the same video. A medium file corresponding to the bitstream 1, a medium file corresponding to the bitstream 2, and the like that belong to the media resource medium 1, and a medium file corresponding to a bitstream 3, a medium file corresponding to a bitstream 4, and the like that belong to the media asset medium 2 may be obtained by transcoding the content source film of the same video.

In an implementation, if a media asset medium includes medium files of a plurality of bitstreams, the plurality of bitstreams have a same encapsulation protocol and a same encoding format. In this case, the encapsulation protocol and the encoding format may be used as a type of the media asset medium. Optionally, bitstreams of a same video that correspond to medium files of bitstreams belonging to different media asset mediums have different encapsulation protocols and/or different encoding formats. For example, if a media asset medium includes medium files of a plurality of bitstreams encapsulated by the encapsulation protocol DASH and encoded by using the encoding format H.265, the type of the media asset medium may be the encapsulation protocol DASH and the encoding format H.265.

In another implementation, if a media asset medium includes medium files of a plurality of bitstreams, the plurality of bitstreams have a same encapsulation protocol. In this case, the encapsulation protocol may be used as a type of the media asset medium. For example, if a media asset medium includes medium files of a plurality of bitstreams encapsulated by the encapsulation protocol DASH, a type of the media asset medium may be the encapsulation protocol DASH.

The media asset medium has a media asset medium identifier (identifier, ID).

(4) Index File of the Media Asset Medium

One media asset medium corresponds to one index file of a media asset medium. The index file of the media asset medium includes header information of the index file, second information that corresponds to a medium file of a bitstream included in the media asset medium and that is of the bitstream, and the like. The index file of the media asset medium may be an index plain text file encoded by using a variable-length character encoding format (UTF-8). Certainly, this disclosure is not limited thereto.

FIG. 1A is a schematic diagram of a relationship between an index file of a media asset medium and the media asset medium. A media asset medium 1 corresponds to an index file of the media asset medium 1, and the index file of the media asset medium 1 includes second information of a bitstream 1 belonging to the media asset medium 1, second information of a bitstream 2 belonging to the media asset medium 1, and the like. A media asset medium 2 corresponds to an index file of the media asset medium 2, and the index file of the media asset medium 2 includes second information of a bitstream 3 belonging to the media asset medium 2, second information of a bitstream 4 belonging to the media asset medium 2, and the like.

For example, for a bitstream whose encapsulation protocol is the DASH protocol, a format of an index file of a media asset medium to which a medium file corresponding to the bitstream belongs is a media presentation description (MPD) format. For a bitstream whose encapsulation protocol is the HLS protocol, a format of an index file of a media asset medium to which a medium file corresponding to the bitstream belongs is an M3U8 format.

(5) First Information of the Bitstream

The first information of the bitstream includes key frame (key I frame) description information of the bitstream. Optionally, the first information may further include at least one of fragment information and GOP description information of the bitstream. Optionally, the first information may further include segment description information of the content source film of the video in a process of generating the medium file of the bitstream.

It may be understood that, to ensure continuity of video playing on a terminal APP, bitstreams corresponding to all medium files of bitstreams belonging to a same media asset medium have same first information. Therefore, when a media asset subsystem stores the first information of the bitstream, only one piece of first information is stored in a same media asset medium. Therefore, the first information of the bitstream belonging to the media asset medium may also be understood as first information of the media asset medium.

First information corresponding to different media asset mediums may be the same or may be different.

FIG. TA is a schematic diagram of a relationship between first information of a media asset medium and the media asset medium. A media asset medium 1 corresponds to first information of the media asset medium 1, and the media asset medium 2 corresponds to first information of the media asset medium 2. The first information of the media asset medium 1 may be the same as or different from the first information of the media asset medium 2.

Segment description information is information used to describe segmentation of the content source film of the video in a process of generating a medium file of a bitstream. The segment description information includes a sequence number of a segment (for example, each segment) obtained by dividing the content source segment of the video, and offset timestamps of a start frame and an end frame of the segment (for example, each segment) relative to a start time of the video. Optionally, the segment description information may further include a segment duration and the like. It may be understood that, before a transcoding subsystem transcodes the content source film of the video, the content source film of the video may be divided into a plurality of segments, so that parallel transcoding can be performed on the plurality of segments by using a plurality of transcoding subsystems, to improve transcoding efficiency. For example, if a video has a duration of 93 minutes, a content source segment of the video may be divided into 19 segments with 5 minutes a segment, where the last segment is 3 minutes long. The 19 segments may be transcoded simultaneously by using 19 transcoding subsystems. During a specific implementation, the content source film of the video may be divided into a plurality of segments based on an actual requirement. Certainly, the content source film of the video may alternatively not be segmented based on an actual requirement.

Fragment description information is information used to describe a fragment in the bitstream. The fragment description information may include a sequence number of the fragment (for example, each fragment) in the bitstream and offset timestamps of a start frame and an end frame of the fragment (for example, each fragment) relative to the start time of the video. Optionally, the fragment description information may further include at least one of the following: a fragment duration, a quantity of GOPs in the fragment, the offset timestamps of the start frame and the end frame of the fragment relative to the start time of the video, and the like. Optionally, the fragment description information may further include at least one of the following: a sequence number of the fragment in a segment to which the fragment belongs, a sequence number of the segment to which the fragment belongs, and the like.

GOP description information is information used to describe a GOP in the bitstream. The GOP description information may include a sequence number of the GOP in the bitstream to which the GOP belongs, and offset timestamps of a start frame and an end frame of the GOP relative to the start time of the video. Optionally, the GOP description information may further include at least one of the following: a sequence number of the GOP in a fragment to which the GOP belongs, a sequence number of the fragment to which the GOP belongs, a duration of the GOP, GOP sequence information, and the like. The GOP sequence information includes a type of each frame included in the GOP (for example, whether each frame is an I frame, a P frame, or a B frame), such as IBPBBPBPBBIBP.

Key frame description information is information used to describe the key frame in the bitstream. The key frame description information may include location information of the key frame and whether the key frame is an IDR frame. The location information of the key frame may be represented by using a sequence number of the key frame in the bitstream. The sequence number of the key frame in the bitstream includes sequence numbers of a B frame and a P frame. For example, a frame sequence in a bitstream is IBPBBPBPBBIBP, and sequence numbers of key frames are 1 and 12. Optionally, the location information of the key frame may alternatively be represented by using a sequence number of the key frame in a GOP to which the key frame belongs, a sequence number of the GOP to which the key frame belongs, a sequence number of the fragment to which the GOP belongs, a sequence number of the fragment in a bitstream, or an offset timestamp of the key frame relative to the start time of the video. This is not specifically limited in this disclosure.

(6) Metadata Information of the Video

The metadata information of the video may include identification information (for example, a video name) of the video, a release time of the video, media asset medium information of the video, and the like. The media asset medium information of the video may include at least one of the following: a download address of an index file of a media asset medium, an identifier of the media asset medium, and an attribute of a bitstream corresponding to a medium file of a bitstream included in the media asset medium, for example, a resolution, a bit rate, and whether the bitstream supports an HDR.

(7) Video Variable Bit Rate Playing Technology

The video variable bit rate playing technology means that when playing a video, a terminal selects, based on a network bandwidth condition of a user, the most appropriate bitstream to play the video to the user, to provide the user with the smoothest playing experience.

(8) Other Terms

In the specification, claims, and accompanying drawings of this disclosure, the terms "first", "second", "third" and the like are intended to distinguish different objects but do not limit a particular sequence.

In the embodiments of this disclosure, the term "example" or "for example" is used to represent giving an example, an illustration, or a description. Any embodiment or design scheme described as an "example" or with "for example" in the embodiments of this disclosure should not be explained as being more preferred or having more advantages than another embodiment or design scheme. Exactly, use of the term such as "example" or "for example" is intended to present a related concept in a specific manner.

In the embodiments of this disclosure, "at least one" means one or more. "A plurality of" refers to two or more than two.

The term "and/or" in the embodiments of this disclosure describes only an association relationship for describing associated objects and represents that three relationships may exist. For example, A and/or B may represent the following three cases: Only A exists, both A and B exist, and only B exists. In addition, the character "/" in this specification generally indicates an "or" relationship between associated objects.

Figure 2:
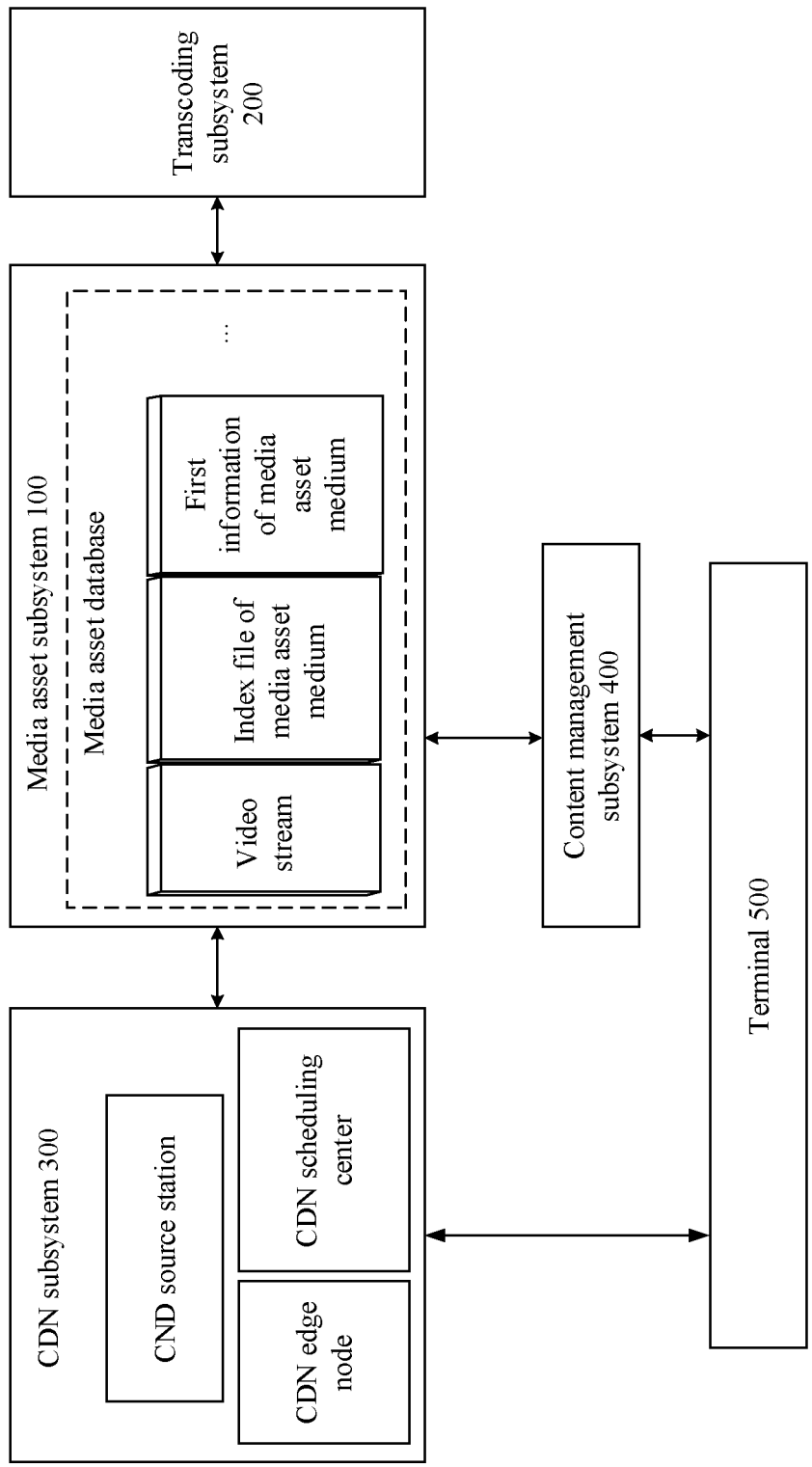
FIG. 2 is a schematic block diagram of an architecture of a video transcoding system according to an embodiment of this disclosure.

FIG. 2 is a schematic block diagram of an architecture of a video transcoding system that may be used in an embodiment of this disclosure. As shown in FIG. 2, the video transcoding system includes: a media asset subsystem 100, a transcoding subsystem 200, a content delivery network (CDN) subsystem 300, a content management subsystem 400, and a terminal 500.

The media asset subsystem 100 is configured to store a content source film of a video, metadata information of the video, and a media asset library of the video. The media asset library of the video includes an index file of a media asset medium, first information of the media asset medium, and the like. Optionally, the media asset library of the video may further include one or more medium files of one or more bitstreams in the media asset medium.

The transcoding subsystem 200 is configured to transcode the content source film of the video.

The CDN subsystem 300 is configured to store a medium file of a bitstream, an index file of a media asset medium, and the like.

The content management subsystem 400 is configured to perform video operation management (such as video content presentation and video content operation). The content management subsystem 400 may be configured to manage metadata information of the video.

A video APP player may be installed on the terminal 500. The video APP player is configured to play the video.

Optionally, any systems of the media asset subsystem 100, the transcoding subsystem 200, the CDN subsystem 300, and the content management subsystem 400 may be located on independent physical devices, or may be integrated on a same physical device. Alternatively, any one of the media asset subsystem 100, the transcoding subsystem 200, the CDN subsystem 300, and the content management subsystem 400 may include one or more physical devices. For example, the CDN subsystem 300 includes a CDN source station, a CDN edge node, a CDN scheduling center, and the like.

It should be noted that the video transcoding system shown in FIG. 2 is an example of a video transcoding system to which the technical solutions provided in the embodiments of this disclosure are applicable, and does not limit the video transcoding system to which the technical solutions provided in the embodiments of this disclosure are applicable.

In an example, based on the video transcoding system shown in FIG. 2, a video playing process may include: When a user selects a video by using the video APP player installed on the terminal 500, the video APP player determines, based on an operating system (such as Android, or iPhone operating system (IOS)) supported by the terminal 500, a type of a media asset medium supported by the terminal 500, and sends, to the content management subsystem 400, an instruction including the type of the media asset medium and identification information of the selected video. Then, the content management subsystem 400 determines a download address of an index file of the media asset medium based on the type of the media asset medium and the identification information of the video that are included in the instruction, and sends the download address of the index file of the media asset medium to the terminal 500. Next, the video APP player installed on the terminal 500 obtains the index file of the media asset medium from the CDN subsystem 300 based on the download address of the index file of the media asset medium, and obtains one or more medium files of one or more bitstreams in the media asset medium of the video based on the index file. Finally, the video APP player selects, based on a network bandwidth condition, a medium file of a proper bitstream in the media asset medium to play the video to the user.

The following clearly describes the technical solutions in the embodiments of this disclosure with reference to the accompanying drawings in the embodiments of this disclosure. Apparently, the described embodiments are merely some but not all of the embodiments of this disclosure. All other embodiments obtained by a person of ordinary skill in the art based on the embodiments of this disclosure without creative efforts shall fall within the protection scope of this disclosure.

Figure 3A:
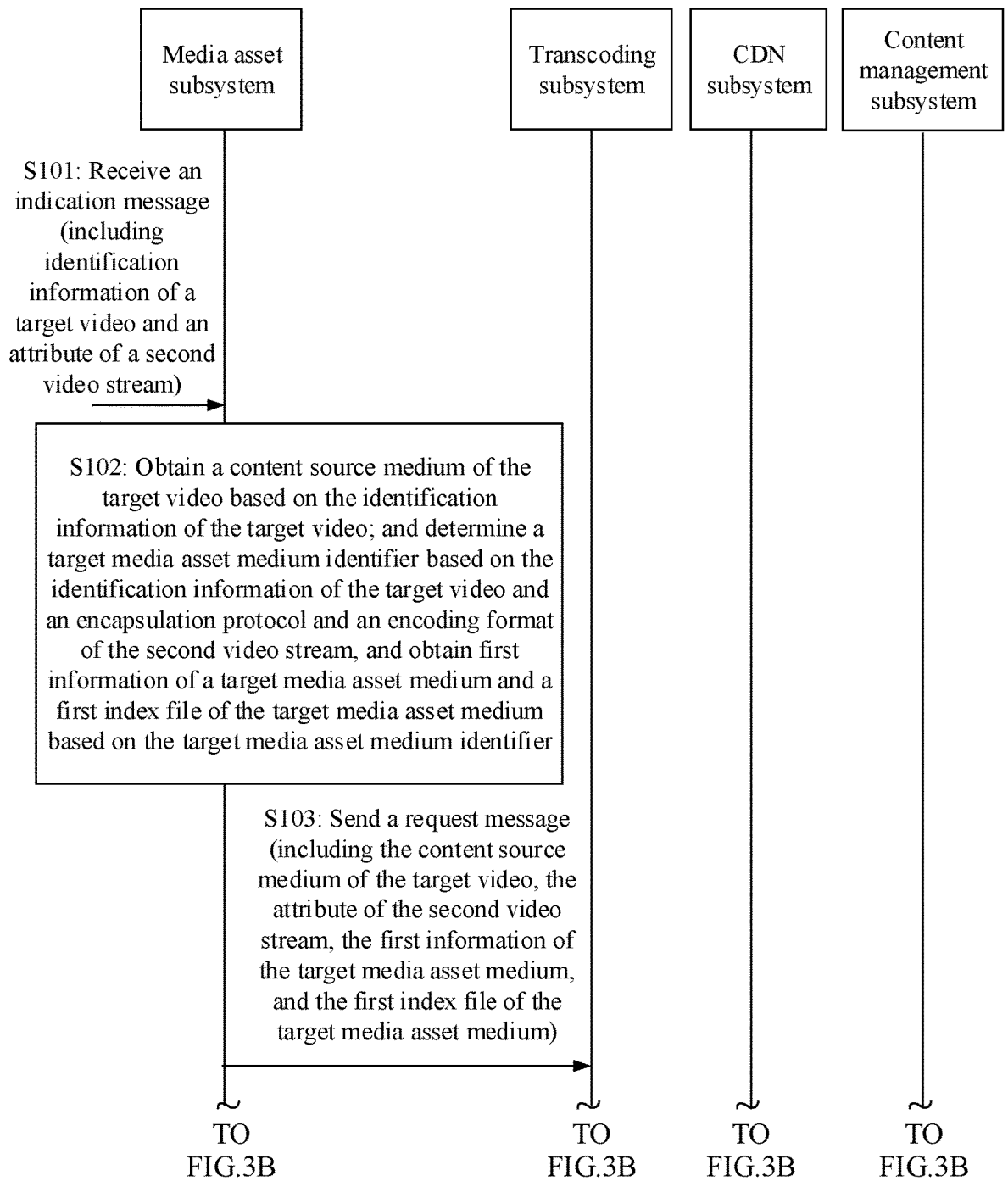
FIG. 3 is a schematic flowchart of a video decoding method according to an embodiment of this disclosure.
Figure 3B:
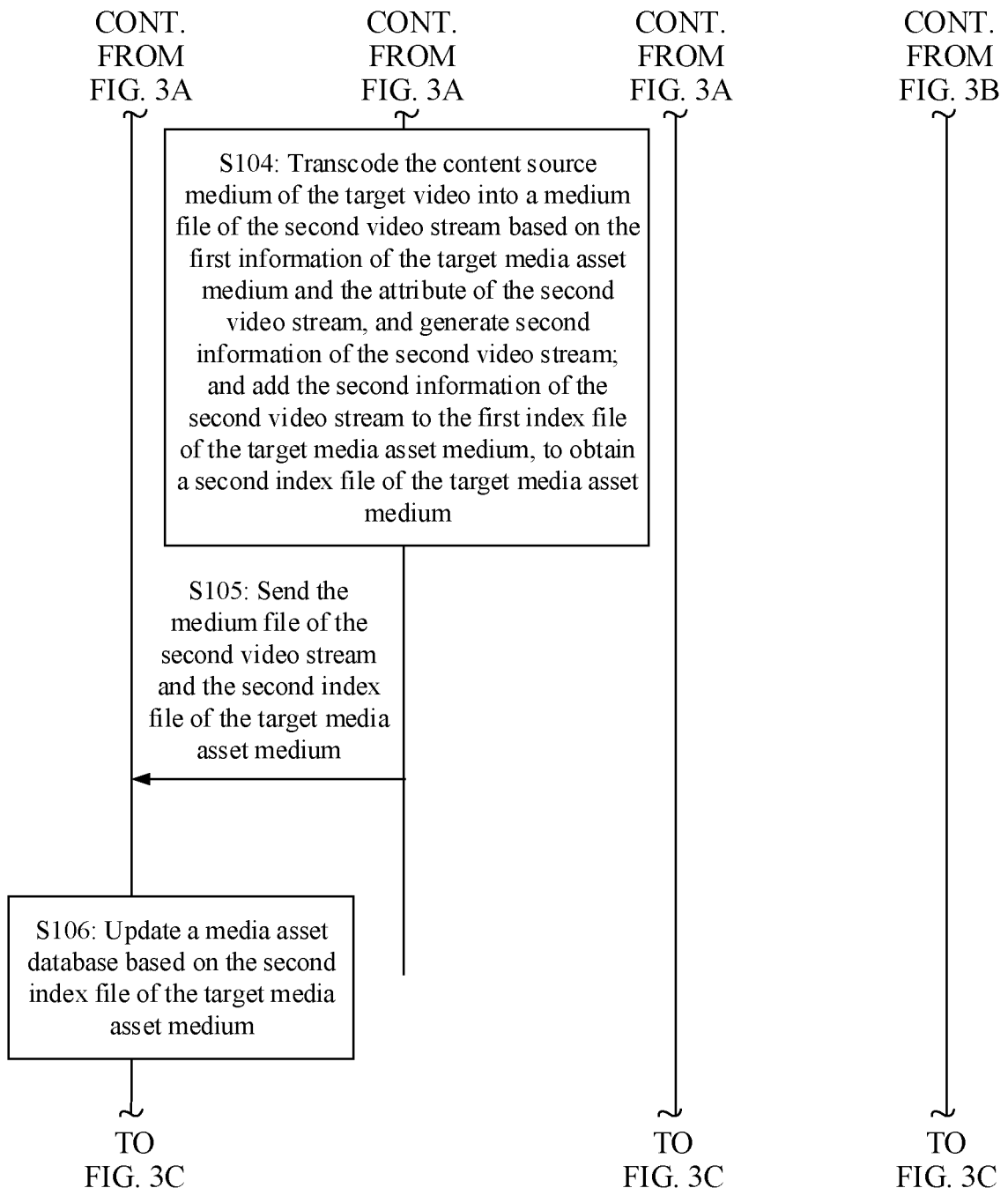
Figure 3C:
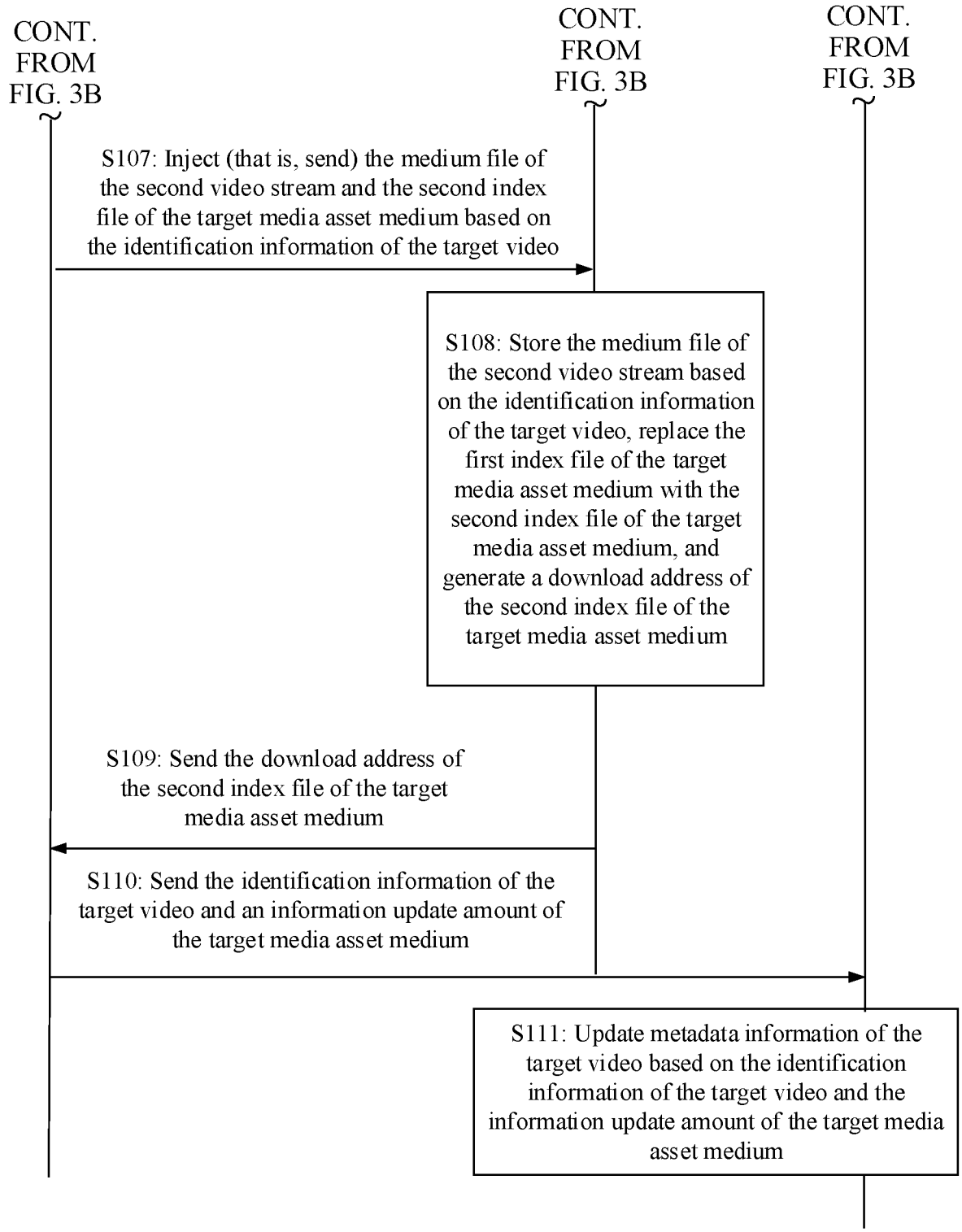

FIG. 3 is a schematic flowchart of a video decoding method according to an embodiment of this disclosure; For example, the method may be applied to the video transcoding system shown in FIG. 2. Certainly, this disclosure is not limited thereto. This embodiment is described by using an example in which a medium file of a second bitstream is added to a target media asset medium. That is, before S101 is performed, the target media asset medium includes a medium file of at least one bitstream. Example 1: A video is a film Wandering Earth, and the target media of the film has medium files of three bitstreams (denoted by medium files 1 to 3 of the bitstreams). The medium files 1 to 3 of the bitstreams all belong to a same media asset medium. For example, encapsulation protocols of bitstreams corresponding to the medium files 1 to 3 of the bitstreams are all DASH, and encoding formats are all H.265. In addition, resolutions of the bitstreams 1 to 3 are 480P, 720P, and 1080P respectively, and bit rates are all 3.5 Mbps, and all support an HDR.

The video transcoding method shown in FIG. 3 may include the following steps.

S101. The media asset subsystem receives an indication message. The indication message is used to indicate to add the medium file of the second bitstream to the target media resource medium. The indication message includes identification information of a target video and an attribute of the second bitstream. The attribute of the second bitstream may include an encapsulation protocol, an encoding format, a resolution, a bit rate, and whether an HDR is supported.

The indication message may be delivered by an administrator. Certainly, this embodiment of this disclosure is not limited thereto. Based on Example 1, the indication message may include identification information of the film Wandering Earth and an attribute of the second bitstream (for example, the encapsulation protocol is DASH, the encoding format is H.265, the resolution is 4K, the bit rate is 3.5 Mbps, and the HDR is supported).

S102. The media asset subsystem obtains a content source film of the target video based on the identification information of the target video. The media asset subsystem determines a target media asset medium identifier based on the identification information of the target video and the encapsulation protocol and the encoding format of the second bitstream, and obtains first information of the target media asset medium and a first index file of the target media asset medium based on the target media asset medium identifier. The first information of the target media asset medium may include key frame description information. The first index file may include second information of an existing bitstream (for example, second information of all existing bitstreams).

For example, the media asset subsystem may determine a type of the target media asset medium based on the encapsulation protocol and the encoding format of the second bitstream, and then determine the target media asset medium identifier based on the identification information of the target video and the type of the target media asset medium. The media asset subsystem may store information in Table 1 for query by the media asset subsystem. Certainly, only one implementation is provided herein. During a specific implementation, a method in a conventional technology may be used. This is not specifically limited in this disclosure.

TABLE 1

| Video ID | Media asset medium identifier | Media asset medium type |
|---|---|---|
| Video 1 | 1 | DASH + H.265 |
|  | 2 | HLS + H.264 |
| Video 2 | 1 | DASH + H.265 |
|  | 2 | HLS + H.264 |

The first information of the target media asset medium is first information of a bitstream corresponding to a medium file of at least one bitstream that belongs to the target media asset medium. The first information of the target media asset medium may further include at least one of fragment description information, GOP description information, and segment description information of the bitstream corresponding to the medium file of the bitstream in the target media asset medium.

Based on Example 1, assuming that a video identifier of the film Wandering Earth is the video 1 in Table 1, the target media asset medium identifier is 1. The first information of the target media asset medium includes key frame description information of any one of the bitstreams 1 to 3. The first index file of the target media asset medium includes second information of bitstreams 1 to 3.

Optionally, the media asset subsystem may store a correspondence between identification information of a plurality of videos and download addresses of content source films of the plurality of videos, and a correspondence exists between identification information of each video and a download address of a content source film of the video. Based on this, when S102 is performed, the media asset subsystem may obtain, based on the correspondence and the identification information of the target video, a download address of the content source film corresponding to the identification information of the target video (that is, obtain the content source film of the target video).

Optionally, the media asset subsystem may store a correspondence between a plurality of media asset medium identifiers and first information of a plurality of media asset mediums, and a correspondence exists between a type of each media asset medium and first information of the media asset medium. Based on this, when S102 is performed, the media asset subsystem obtains, based on the correspondence and the target media asset medium identifier, the first information of the target media asset medium corresponding to the target media asset medium identifier.

S103. The media asset subsystem sends a request message to the transcoding subsystem. The request message includes: the content source film of the target video, the attribute of the second bitstream (for example, the attribute of the second bitstream in S101), the first information of the target media asset medium, and the first index file of the target media asset medium. The request message is used to request the transcoding subsystem to transcode the content source segment of the target video into a medium file of the second bitstream.

This embodiment is described by using an example in which the content source film of the target video, the attribute of the second bitstream, the first information of the target media asset medium, and the first index file of the target media asset medium are all carried in a same message (for example, the request message) for sending. Alternatively, any two pieces of information in the information may be carried in a same message for sending, or may be carried in different messages for sending. Alternatively, if the information is carried in a plurality of messages, any two of the plurality of messages may or may not be sent at the same time.

Optionally, "the media asset subsystem obtains the content source film of the target video based on the identification information of the target video" in step S102 may be replaced with "the media asset subsystem obtains the download address of the content source film of the target video based on the identification information of the target video". In this case, "the content source film of the target video" in the request message in step S103 may be replaced with "the download address of the content source film of the target video". Before step S104, the method may further include: The transcoding subsystem sends the download address of the content source film of the target video in the request message to the media asset subsystem, to obtain the content source film of the target video.

Optionally, "the first index file of the target media asset medium" in step S102 may be replaced with "a download address of the first index file of the target media asset medium". In this case, "the first index file of the target media asset medium" in the request message in step S103 may be replaced with "the download address of the first index file of the target media asset medium". Before step S107, the method may further include: The transcoding subsystem obtains the first index file of the target media asset medium from the media asset subsystem based on the download address of the first index file of the target media asset medium.

It may be understood that, in this disclosure, a method for obtaining, by the transcoding subsystem, the content source film of the target video and the first index file of the target media asset medium is not specifically limited. During a specific implementation, a method in a conventional technology may be used for implementation.

During a specific implementation, the method may further include: The transcoding subsystem sends a response message to the media asset subsystem. The response message is used to inform the media asset subsystem that the transcoding subsystem has received the request message.

S104. The transcoding subsystem transcodes the content source film of the target video into the medium file of the second bitstream based on the first information of the target media asset medium and the attribute of the second bitstream, and generates second information of the second bitstream; and adds the second information of the second bitstream to the first index file of the target media asset medium, to obtain a second index file of the target media asset medium.

Key frame description information of the second bitstream is the same as the key frame description information in the first information of the target media asset medium. For example, the key frame description information in the first information of the target media asset medium includes sequence numbers of key frames in a bitstream to which the key frames belong, for example, 1, 4, 9, 11, 16, 20, 25, and 30, and whether the key frames are IDR frames: yes, no, yes, no, yes, no, and no. Then, sequence numbers of key frames of the second bitstream obtained by the transcoding subsystem through transcoding based on the first information are also 1, 4, 9, 11, 16, 20, 25, and 30, and key frames whose sequence numbers are 1, 9, and 20 are also identified as IDR frames.

Optionally, GOP description information of the second bitstream is the same as the GOP description information in the first information of the target media asset medium. Optionally, fragment description information of the second bitstream is the same as the fragment description information in the first information of the target media asset medium. Optionally, segment description information when the content source film of the target video is segmented during transcoding is the same as the segment description information in the first information of the target media asset medium.

The second information of the second bitstream may include: a resolution of the second bitstream, an encoding format of the second bitstream, and download URL information of the second bitstream, and the like. For example, based on Example 1, the second information of the second bitstream may include: the resolution 4K, the encoding format H.265, and the download URL information of the second bitstream.

The adding the second information of the second bitstream to the first index file of the target media asset medium may be understood as updating the first index file based on the second information of the second bitstream to obtain the second index file. Based on Example 1, the first index file of the target media asset medium may include the second information of the bitstreams 1 to 3, and the second index file may include the second information of the bitstreams 1 to 3 and the second information of the second bitstream.

S105. The transcoding subsystem sends the medium file of the second bitstream and the second index file of the target media asset medium to the media asset subsystem.

Optionally, steps S104 and S105 may be replaced as follows: The transcoding subsystem transcodes the content source film of the target video into the medium file of the second bitstream based on the first information of the target media asset medium and the attribute of the second bitstream, and generates second information of the second bitstream. Then, the transcoding subsystem sends the medium file of the second bitstream and the second information of the second bitstream to the media asset subsystem, and the media asset subsystem adds the second information of the second bitstream to the first index file of the target media asset medium, to obtain a second index file of the target media asset medium. In this case, the request message in step S103 may not include the first index file of the target media asset medium. In this way, the media asset subsystem updates the first index file of the target media asset medium, so that file transmission between the media asset subsystem and the transcoding subsystem can be reduced, thereby saving network transmission resources.

Optionally, during specific implementation, the transcoding subsystem may send the second information of the second bitstream to the media asset subsystem in a form of a third index file. This is not specifically limited in this disclosure.

S106. The media asset subsystem updates the media asset library based on the second index file of the target media asset medium. For example, the media asset subsystem may replace the first index file of the target media asset medium in the media asset library with the second index file of the target media asset medium.

Optionally, the media asset subsystem may store the medium file of the second bitstream into the media asset library.

S107. The media asset subsystem injects (that is, sends) the medium file of the second bitstream and the second index file of the target media asset medium to the CDN subsystem based on the identification information of the target video.

S108. The CDN subsystem stores the medium file of the second bitstream based on the identification information of the target video, replaces the first index file of the target media asset medium with the second index file of the target media asset medium, and generates a download address of the second index file of the target media asset medium.

S109. The CDN subsystem sends the download address of the second index file of the target media asset medium to the media asset subsystem.

For example, in an actual implementation, steps S107 to S109 may be performed by the CDN source station in the CDN subsystem.

S110. The media asset subsystem sends the identification information of the target video and an update amount of target media asset medium information to the content management subsystem. The update amount of the target media asset medium information includes the download address of the second index file of the target media asset medium and related information of the second bitstream corresponding to the medium file of the second bitstream in the target media asset medium, for example, the resolution of the second bitstream, the bit rate of the second bitstream, and whether the HDR is supported.

It may be understood that, that the media asset subsystem sends the identification information of the target video and the update amount of the target media asset medium information to the content management subsystem in step S110 may also be considered as that the media asset subsystem synchronizes the update amount of the target media asset medium information to the content management subsystem.

S111. The content management subsystem updates metadata information of the target video based on the identification information of the target video and the update amount of the target media asset medium information.

A sequence of performing step S106 and performing steps S107 to S111 is not specifically limited in this embodiment of this disclosure. For example, step S106 may be performed before steps S107 to S111, step S106 may be performed after steps S107 to S111, or step S106 may be performed in a process of performing steps S107 to S111.

Based on example 1, before step S111 is performed, the metadata information of the target video that is stored in the content management subsystem includes: a name of the film Wandering Earth and target media asset medium information. The target media asset medium information includes a download address of the first index file of the media asset medium, the target media asset medium identifier 1, and the attributes of the bitstreams 1 to 3 corresponding to the medium files 1 to 3 of the bitstreams included in the target media asset medium, for example, the resolutions of the bitstreams 1 to 3, the bit rates 3.5 Mbps of the bitstreams 1 to 3, and that the bitstreams 1 to 3 all supports the HDR. The update amount of the target media asset medium information includes information such as the download address of the second index file of the target media asset medium, the resolution 4K of the second bitstream, the bit rate 3.5 Mbps of the second bitstream, and that the second bitstream supports the HDR. After step S111 is performed, the metadata information of the target video includes the name of the film Wandering Earth and the target media asset medium information. The target media asset medium information includes the download address of the second index file of the media asset medium, the target media asset medium identifier 1, and attributes of bitstreams corresponding to medium files of the bitstreams included in the target media asset medium, which are optionally information such as the resolutions of the bitstreams 1 to 3, the bit rates 3.5 Mbps of the bitstreams 1 to 3, the bitstreams 1 to 3 all support the HDR, the resolution 4K of the second bitstream, the bit rate 3.5 Mbps of the second bitstream, and that the second bitstream supports the HDR.

Based on the video transcoding method provided in this embodiment of this disclosure, a medium file of a newly added bitstream in the media asset medium is obtained through transcoding based on the first information of the media asset medium, so that key frame description information (including location information of a key frame and whether the key frame is an IDR frame) of a bitstream corresponding to a medium file of an existing bitstream and the bitstream corresponding to the medium file of the newly added bitstream in the media asset medium is the same. Location information of a key frame of the generated and newly added bitstream and location information of a key frame of the existing bitstream may be made the same by using the location information of the key frame. Based on whether the key frame is an IDR frame, it can be ensured that bitstream switching starts from an IDR frame, which helps the terminal to select, based on a network bandwidth condition, the most appropriate bitstream in the media asset medium to play a video, thereby implementing continuity of video picture playing. In addition, it is unnecessary to discontinue medium files corresponding to all existing bit streams in a media asset medium to which the medium file corresponding to the newly added bit streams belong, re-transcode a content source film of the video to generate medium files corresponding to all bit streams in the media asset medium (including medium files corresponding to the existing bitstreams and medium files corresponding to the newly added bitstreams), and then re-release the medium files, and unnecessary to regenerate the index file of the target media asset medium. Therefore, this helps reduce transcoding resource consumption and transcoding costs, shorten transcoding time, and improve release efficiency.

It should be noted that, in related steps (for example, steps S105, S106, and S109) in this embodiment of this disclosure, any two pieces of information sent by one device (or system) to another device (or system) may be carried in a same message for sending, or may be carried in different messages for sending. If the any two pieces of information are carried in different messages, the two messages may or may not be sent at the same time. For example, in step S105, the second bitstream and the second index file of the target media asset medium may be carried in a same message for sending, or may be carried in different messages for sending.

If the two pieces of information are carried in different messages, the two messages may or may not be sent at the same time.

In addition, it should be noted that the video transcoding method shown in FIG. 3 is merely an example, and constitutes no limitation on the video transcoding method provided in the embodiments of this disclosure. For example, when there is no conflict, an execution sequence between any steps shown in FIG. 3 may be changed. For example, the step "the media asset subsystem sends the medium file of the second bitstream to the CDN subsystem" in step S107 may be performed in any step after S105. Other examples are not listed. For another example, some information or steps shown in FIG. 3 may be optional. For example, the attribute of the second bitstream described in S101 may not include "whether the HDR is supported".

The following describes, by using specific examples, the first index file and the second index file of the target media asset medium that are provided in this embodiment of this disclosure.

(1) When the encapsulation protocol of the bitstream in the target media asset medium is DASH, and the format of the index file of the target media asset medium is an MPD format, based on Example 1, the first index file of the target media asset medium may be:

```
<?xml version="1.0" encoding="utf-8"?>
  <Period>
    <AdaptationSet id="1" group="1" contentType="video" par="4:3"
segmentAlignment="true" subsegmentAlignment="true"
subsegmentStartsWithSAP="1"
mimeType="video/mp4" startWithSAP="1">
    <Representation id="1" bandwidth="1567097" width="854"
       height="480"
codecs="hev1">
  <BaseURL>example_480.mp4?bandwidth=1567097 </BaseURL>
      <SegmentBase timescale="90000" indexRangeExact="true"
indexRange="1869-12060">
       <Initialization range="0-1868"/>
       </SegmentBase>
     </Representation>
     <Representation id="2" bandwidth="2135976" width="1280"
        height="720"
codecs="hev1"> <BaseURL>example_720.mp4?bandwidth=2135976
</BaseURL>
     <SegmentBase timescale="90000" indexRangeExact="true"
indexRange="1853-12044">
        <Initialization range="0-1852"/>
        </SegmentBase>
     </Representation>
     <Representation id="3" bandwidth="4243308" width="1920"
        height="1080"
codecs="hev1">
  <BaseURL>Example080.mp4?bandwidth=4243308 </BaseURL>
     <SegmentBase timescale="90000" indexRangeExact="true"
indexRange="1854-12045">
        <Initialization range="0-1853"/>
        </SegmentBase>
     </Representation>
   </Period>
</MPD>
```

Based on this, the second index file of the target media asset medium may be:

```
<?xml version="1.0" encoding="utf-8"?>
  <Period>
    <AdaptationSet id="1" group="1" contentType="video" par="4:3"
segmentAlignment="true" subsegmentAlignment="true"
subsegmentStartsWithSAP="1"
mimeType="video/mp4" startWithSAP="1">
    <Representation id="1" bandwidth="1567097" width="854"
       height="480"
codecs="hev1">
  <BaseURL>example_480.mp4?bandwidth=1567097 </BaseURL>
      <SegmentBase timescale="90000" indexRangeExact="true"
indexRange="1869-12060">
       <Initialization range="0-1868"/>
       </SegmentBase>
     </Representation>
     <Representation id="2" bandwidth="2135976" width="1280"
        height="720"
codecs="hev1"> <BaseURL>example_720.mp4?bandwidth=2135976
</BaseURL>
     <SegmentBase timescale="90000" indexRangeExact="true"
indexRange="1853-12044">
        <Initialization range="0-1852"/>
        </SegmentBase>
     </Representation>
     </Representation id="3" bandwidth="4243308" width="1920"
        height="1080"
codecs="hev1">
  <BaseURL>Example080.mp4?bandwidth=4243308 </BaseURL>
     <SegmentBase timescale="90000" indexRangeExact="true"
indexRange="1854-12045"/>
        <Initialization range="0-1853"/>
        </SegmentBase>
     </Representation>
/*****Second information of the newly added 4K bitstream****/
    <Representation id="4" bandwidth="12360026" width="4096"
       height="2160"
codecs="hev1">
  <BaseURL>example_4K.mp4?bandwidth=12360026 </BaseURL>
     <SegmentBase timescale="90000" indexRangeExact="true"
indexRange="1869-12060">
        <Initialization range="0-1868"/>
        </SegmentBase>
     </Representation>
   </Period>
</MPD>
```

(2) When the encapsulation protocol of the bitstream in the target media asset medium is HLS, and the format of the index file of the target media asset medium is an M3U8 format, based on Example 2 (a difference between Example 2 and Example 1 lies in that a type of the media asset medium in Example 2 is the encapsulation protocol HLS and the encoding format H.264), the first index file of the target media asset medium may be:

```
#EXTM3U
#EXT-X-VERSION:3
#EXT-X-STREAM-INF:PROGRAM-ID=4,BANDWIDTH=1768403,AVERAGE-
BANDWIDTH=588446,CODECS="mp4a.40.5,avc1.64001e",RESOLUTION=854x480
  Example_854X480_600_0.m3u8
  #EXT-X-STREAM-INF:PROGRAM-ID=3,BANDWIDTH=2940620,AVERAGE-
BANDWIDTH=966219,CODECS="mp4a.40.5,avc1.64001f",RESOLUTION=1280x720
  Example_1280X720_1000_0.m3u8
  #EXT-X-STREAM-INF:PROGRAM-ID=1,BANDWIDTH=6951187,AVERAGE-
```

```
BANDWIDTH=2626090,CODECS="mp4a.40.5,avc1.640028",RESOLUTIONS=1920x1080
  Example_1920X1080_3000_0.m3u8
  #EXT-X-ENDLIST
  Based on this, the second index file of the target media asset medium may be:
  #EXTM3U
  #EXT-X-VERSION:3
  #EXT-X-STREAM-INF:PROGRAM-ID=4,BANDWIDTH=1768403,AVERAGE-
BANDWIDTH=588446,CODECS="mp4a.40.5,avc1.64001e",RESOLUTION=854x480
  Example_854X480_600_0.m3u8
  #EXT-X-STREAM-INF:PROGRAM-ID=3,BANDWIDTH=2940620,AVERAGE-
BANDWIDTH=966219,CODECS="mp4a.40.5,avc1.64001f",RESOLUTION=1280x720
  Example_1280X720_1000_0.m3u8
  #EXT-X-STREAM-INF:PROGRAM-ID=1,BANDWIDTH=6951187,AVERAGE-
BANDWIDTH=2626090,CODECS="mp4a.40.5,avc1.640028",RESOLUTION=1920x1080
  Example_1920X1080_3000_0.m3u8
  /*****Second information of the newly added 4K bitstream****/
  #EXT-X-STREAM-INF:PROGRAM-ID=1,BANDWIDTH=24860049,AVERAGE-
BANDWIDTH=12360026,CODECS="mp4a.40.5,avc1.640028",RESOLUTION=4096 x2160
  Example_4096 x2160_12000_0.m3u8
  #EXT-X-ENDLIST
```

Add a secondary index file of the second bitstream Example 4096x2160_12000_0.m3u8.

Figure 4A:
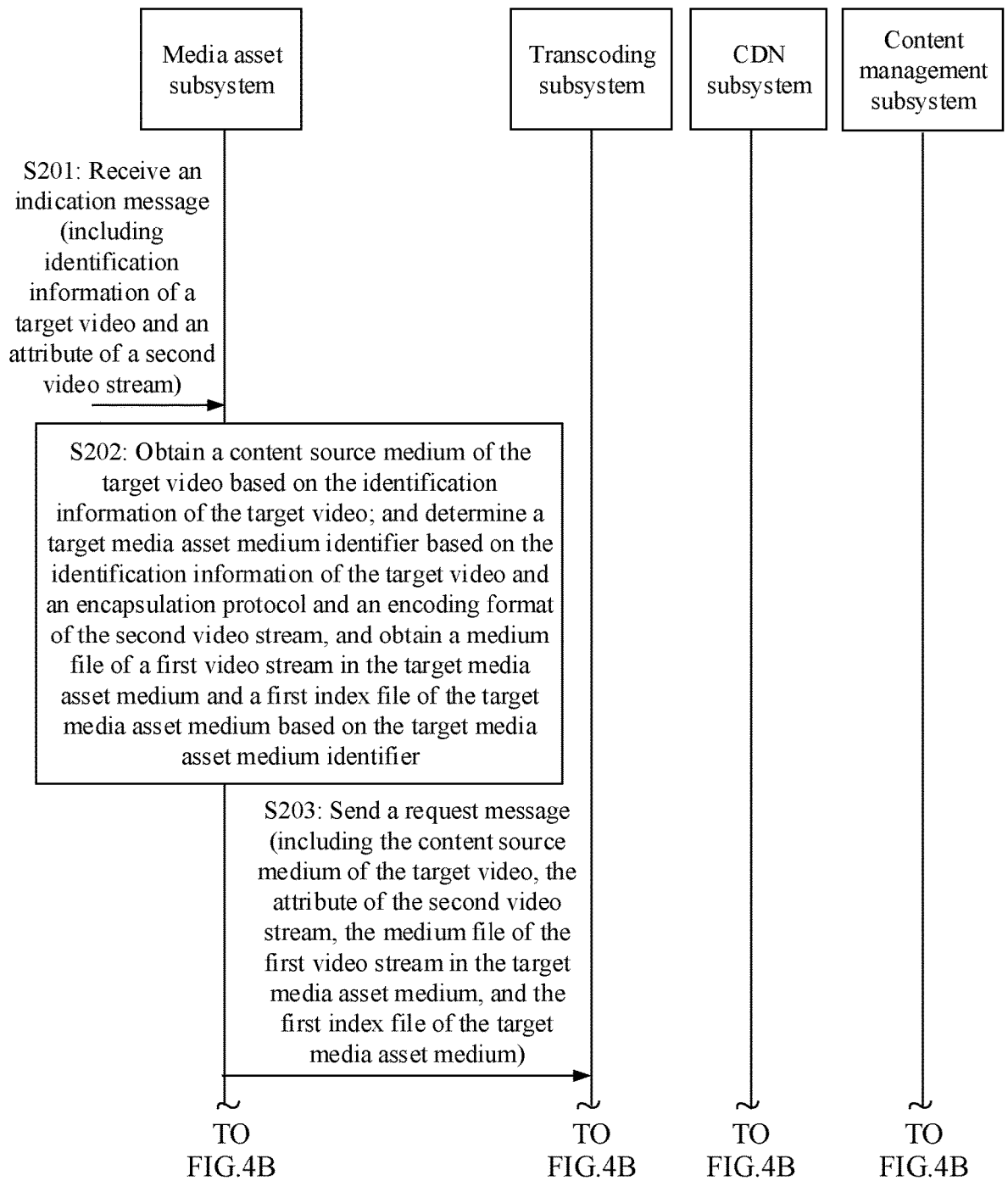
FIG. 4 is a schematic flowchart of another video decoding method according to an embodiment of this disclosure.
Figure 4B:
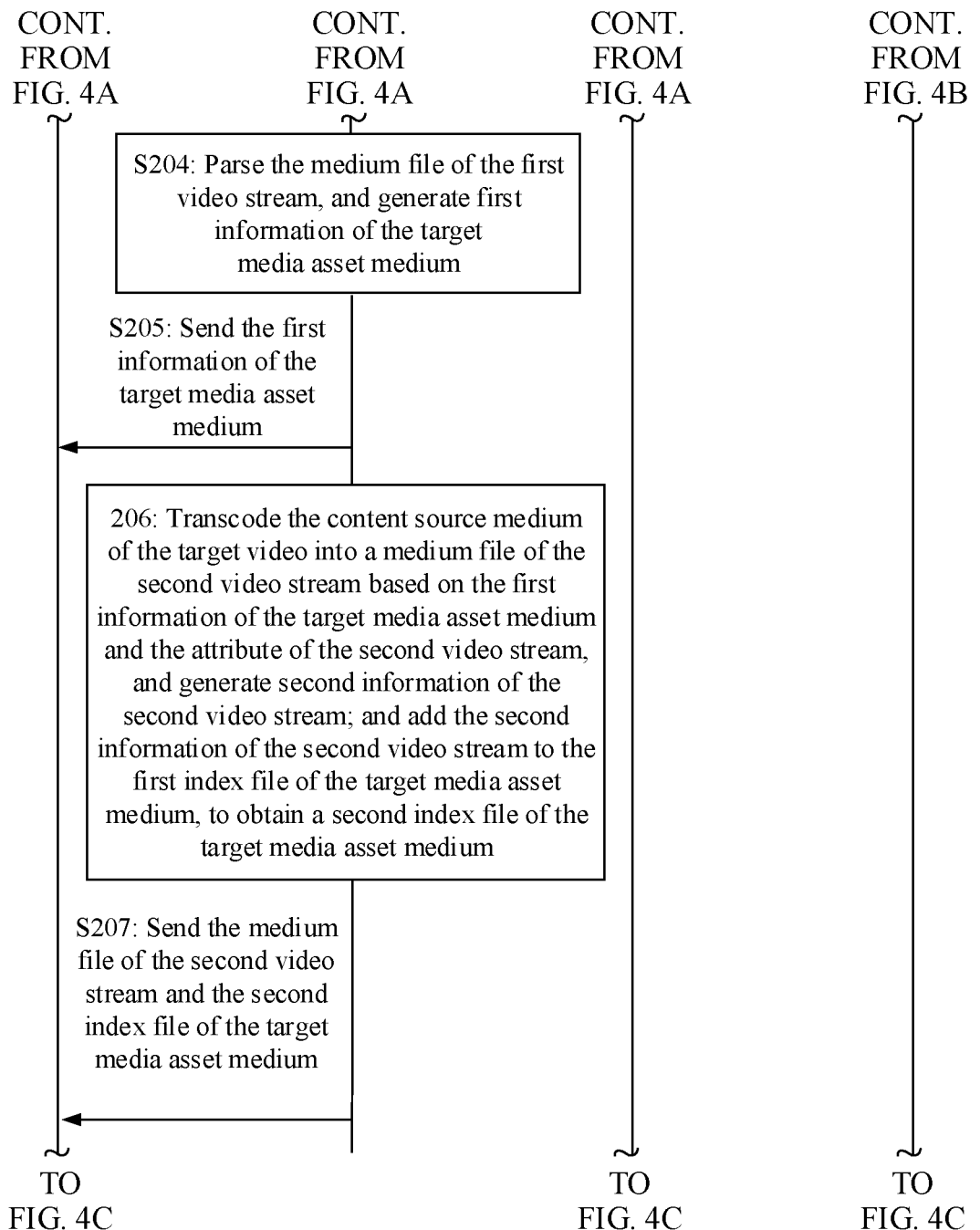
Figure 4C:
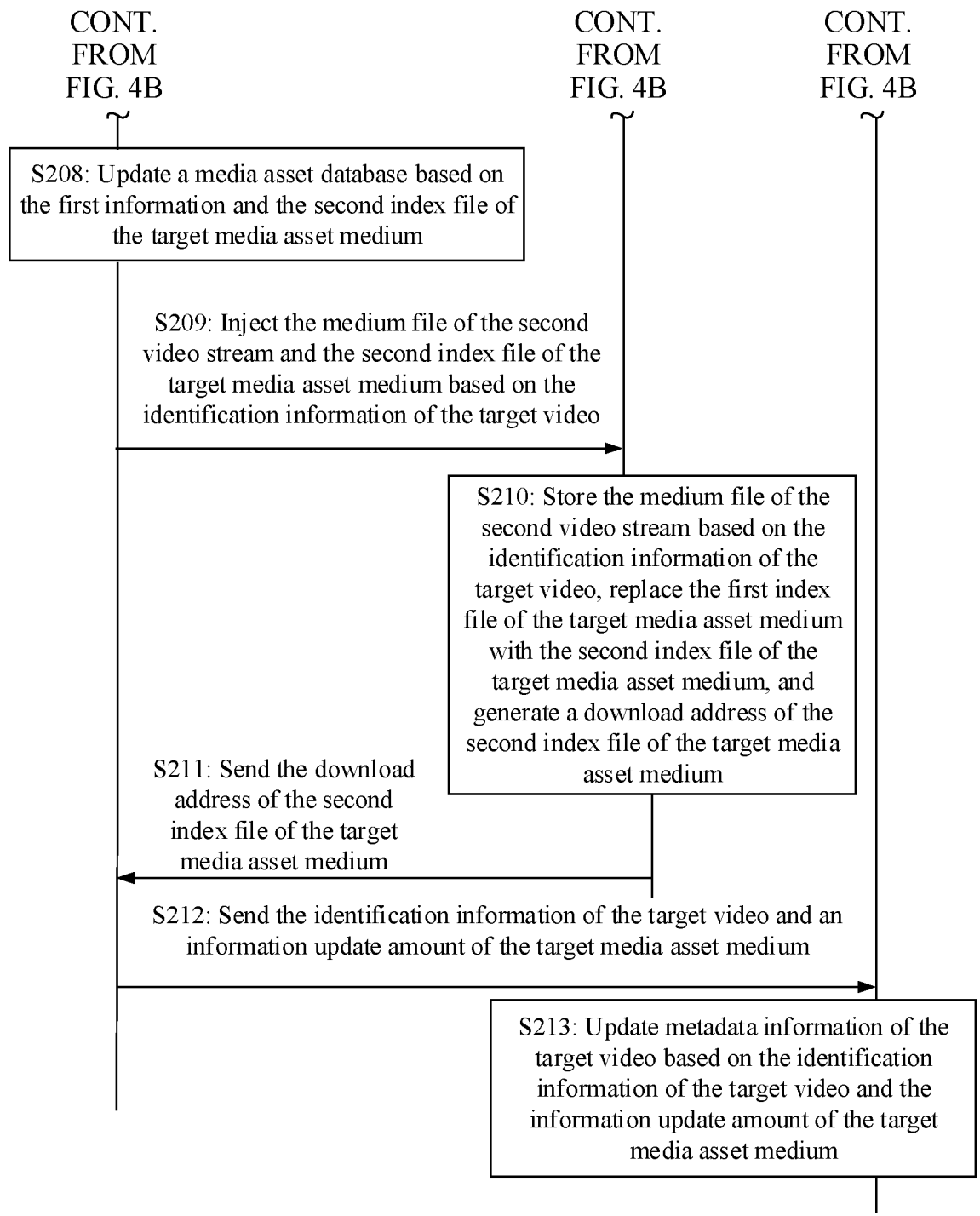

The following describes another video transcoding method according to an embodiment of this disclosure by using FIG. 4. The method shown in FIG. 4 includes the following steps.

For S201, refer to S101. Certainly, this disclosure is not limited thereto.

S202. The media asset subsystem obtains a content source film of the target video based on identification information of the target video. The media asset subsystem determines a target media asset medium identifier based on the identification information of the target video and an encapsulation protocol and an encoding format of the second bitstream, and obtains a medium file of a first bitstream in the target media asset medium and a first index file of the target media asset medium based on the target media asset medium identifier. The medium file of the first bitstream is a medium file of any bitstream belonging to the target media asset medium.

Specifically, for a method for determining the target media asset medium identifier, refer to the method in the example shown in FIG. 3. Details are not described herein again.

Optionally, the media asset subsystem may store a correspondence between a plurality of media asset medium identifiers and medium files of first bitstreams in the plurality of media asset mediums, and a correspondence exists between each media asset medium identifier and a medium file of a first bitstream of the media asset medium. Based on this, when S202 is performed, the media asset subsystem obtains, based on the correspondence and the target media asset medium identifier, the medium file of the first bitstream of the target media asset medium corresponding to the target media asset medium identifier.

S203. The media asset subsystem sends a request message to the transcoding subsystem. The request message includes: the content source film of the target video, the attribute of the second bitstream, the medium file of the first bitstream of the target media asset medium, and the first index file of the target media asset medium. The request message is used to request the transcoding subsystem to transcode the content source segment of the target video into a medium file of the second bitstream.

This embodiment is described by using an example in which the content source film of the target video, the attribute of the second bitstream, the medium file of the first bitstream of the target media asset medium, and the first index file of the target media asset medium are all carried in a same message (for example, the request message) for sending. Alternatively, any two pieces of information in the information may be carried in a same message for sending, or may be carried in different messages for sending. Alternatively, if the information is carried in a plurality of messages, any two of the plurality of messages may or may not be sent at the same time.

During a specific implementation, the method may further include: The transcoding subsystem sends a response message to the media asset subsystem. The response message is used to inform the media asset subsystem that the transcoding subsystem has received the request message.

S204. The transcoding subsystem parses the medium file of the first bitstream, and generates first information of the target media asset medium.

For example, the transcoding subsystem parses the medium file of the first bitstream, to obtain fragment description information, GOP description information, and key frame description information of the first bitstream, and generates the first information of the target medium. For a specific parsing method, refer to a method in a conventional technology. This is not specifically limited in this disclosure.

It may be understood that, because first information of bitstreams corresponding to medium files of all bitstreams in the target media asset medium is the same, it may be considered that the first information generated based on the first bitstream is first information of the target media asset medium.

S205. The transcoding subsystem sends the first information of the target media asset medium to the media asset subsystem.

For S206, refer to S101. Certainly, this disclosure is not limited thereto.

For S207, refer to step S105. Certainly, this disclosure is not limited thereto.

S208. The media asset subsystem updates the media asset library based on the first information and the second index file of the target media asset medium.

For example, the media asset subsystem may store the first information of the target media asset in the media asset library, and replace the first index file of the target media asset in the media asset library with the second index file of the target media asset. The media asset subsystem stores the first information of the target media asset medium into the media asset library, so that when a new bitstream is generated through transcoding next time, the transcoding subsystem may directly transcode the content source film of the target video based on the first information, without parsing the medium file of the first bitstream again, thereby saving computing resources of the transcoding subsystem.

Optionally, the media asset subsystem may store the received medium file of the second bitstream into the media asset library.

For S209 to S213, refer to S107 to S111. Certainly, this disclosure is not limited thereto.

A sequence of performing step S208 and performing steps S209 to S213 is not specifically limited in this embodiment of this disclosure. For example, step S208 may be performed before steps S209 to S213, or step S208 may be performed after steps S209 to S213, or step S208 may be performed in a process of performing steps S209 to S213.

For related explanations and beneficial effects of the video transcoding method provided in this embodiment, refer to related descriptions in the embodiment shown in FIG. 3. Details are not described herein again.

The foregoing mainly describes the solutions provided in the embodiments of this disclosure from a perspective of the methods. To implement the foregoing functions, the solutions provided in the embodiments of this disclosure include corresponding hardware structures and/or software modules for performing the functions. A person of ordinary skill in the art should be easily aware that, modules and algorithm steps of the examples described with reference to the embodiments disclosed in this specification may be implemented in this disclosure by hardware or a combination of hardware and computer software. Whether a function is performed by hardware or hardware driven by computer software depends on particular applications and design constraints of the technical solutions. A person skilled in the art may use a different method to implement the described functions for each particular application, but it should not be considered that the implementation goes beyond the scope of this disclosure.

In the embodiments of this disclosure, function module division may be performed on the domain name system server and the terminal based on the foregoing method embodiments. For example, each function module may be divided based on each function, or two or more functions may be integrated in one processing module. The integrated module may be implemented in a form of hardware, or may be implemented in a form of a software function module. It should be noted that module division in the embodiments of this disclosure is an example, and is merely a logical function division. During actual implementation, another division manner may be used.

Figure 5:
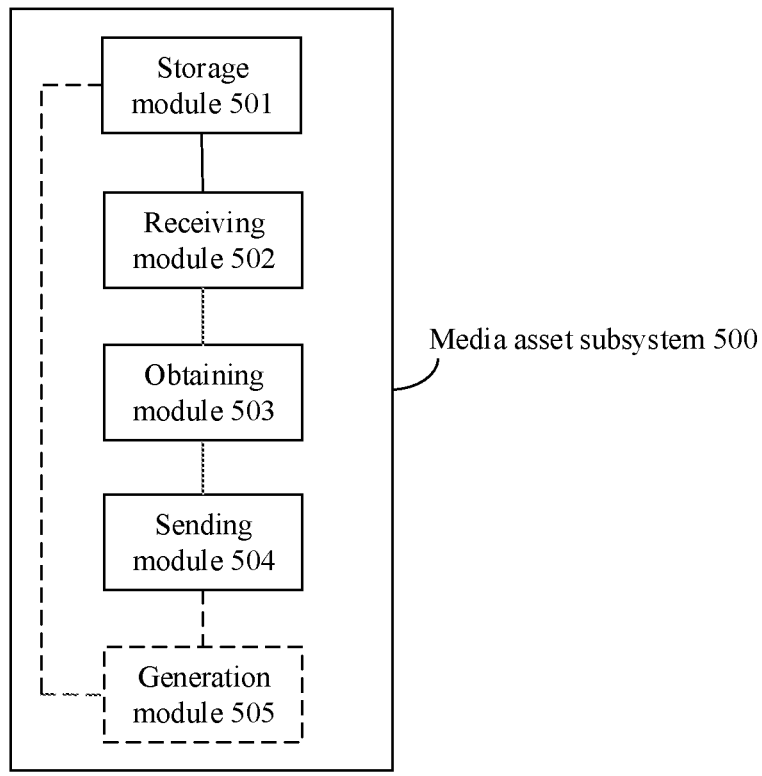
FIG. 5 is a schematic block diagram of a media asset subsystem according to an embodiment of this disclosure.

FIG. 5 is a schematic block diagram of a media asset subsystem 500 according to an embodiment of this disclosure. The media asset subsystem 500 may be configured to perform any video transcoding method provided in the embodiments of this disclosure, for example, the video transcoding method shown in FIG. 3 or FIG. 4.

The media asset subsystem 500 may include a storage module 501, a receiving module 502, an obtaining module 503, and a sending module 504. For example, the storage module 501 is configured to store a target media asset medium of a target video. The target media asset medium includes a medium file corresponding to a first bitstream. The receiving module 502 is configured to receive an indication message. The indication message is used to indicate to add a medium file corresponding to a second bitstream to the target media resource medium. The obtaining module 503 is configured to obtain a content source film of the target video based on the indication message. The sending module 504 is configured to send the content source film of the target video to a transcoding subsystem. The content source film of the target video is used by the transcoding subsystem to generate a medium file corresponding to the second bitstream, first information of the second bitstream is the same as first information of the first bitstream, and the first information includes location information of a key frame and whether the key frame is an instantaneous decoder refresh IDR frame. The receiving module 502 is further configured to receive the medium file that corresponds to the second bitstream and that is sent by the transcoding subsystem. For example, with reference to FIG. 3, the receiving module 502 may be configured to perform S101, the obtaining module 503 may be configured to perform the step of obtaining a content source film of the target video in S102, and the sending module 504 may be configured to perform the step of sending the content source film of the target video in S103. For example, with reference to FIG. 4, the receiving module 502 may be configured to perform S201, the obtaining module 503 may be configured to perform the step of obtaining a content source film of the target video in S202, and the sending module 504 may be configured to perform the step of sending the content source film of the target video in S203.

Optionally, the first information further includes at least one of group of pictures GOP description information, fragment description information, and segment description information.

Optionally, the obtaining module 503 is further configured to obtain the first information of the first bitstream based on the indication message; and the sending module 504 is further configured to send the first information of the first bitstream to the transcoding subsystem. For example, with reference to FIG. 3, the obtaining module 503 may be configured to perform the step of obtaining first information of the target media asset medium in S102, and the sending module 504 may be configured to perform the step of sending the first information of the target media asset medium in S103.

Optionally, the obtaining module 503 is further configured to obtain the medium file corresponding to the first bitstream based on the indication message; and the sending module 504 is further configured to send the medium file corresponding to the first bitstream to the transcoding subsystem. The medium file corresponding to the first bitstream is used by the transcoding subsystem to generate the first information of the first bitstream. For example, with reference to FIG. 4, the obtaining module 503 may be configured to perform step S202, and the sending module 504 may be configured to perform step S203.

Optionally, the receiving module 502 is further configured to receive the first information that is of the first bitstream and that is sent by the transcoding subsystem; and the storage module 501 is further configured to store the first information of the first bitstream. For example, with reference to FIG. 4, the receiving module 502 may be configured to perform S205, and the storage module 501 may be configured to perform S208.

Optionally, the obtaining module 503 is further configured to obtain a first index file of the target media asset medium based on the indication message, where the first index file includes second information of the first bitstream; the receiving module 502 is further configured to receive the second information that is of the second bitstream and that is sent by the transcoding subsystem; and the media asset subsystem 500 further includes a generation module 505, configured to add the second information of the second bitstream to the first index file, to obtain a second index file of the target media asset medium.

Optionally, the obtaining module 503 is further configured to obtain a first index file of the target media asset medium based on the indication message, where the first index file includes second information of the first bitstream; the sending module 504 is further configured to send the first index file to the transcoding subsystem, where the first index file is used by the transcoding subsystem to obtain a second index file of the target media asset medium, and the second index file includes the second information of the first bitstream and second information of the second bitstream; the receiving module 502 is further configured to receive the second index file sent by the transcoding subsystem; and the storage module 501 is further configured to replace the first index file with the second index file. For example, with reference to FIG. 3, the obtaining module 503 may be configured to perform the step of obtaining a first index file of the target media asset medium in S102, the sending module 504 may be configured to perform the step of sending the first index file of the target media asset medium in S103, and the storage module 501 may be configured to perform S106. For example, with reference to FIG. 4, the obtaining module 503 may be configured to perform the step of obtaining a first index file of the target media asset medium in S202, the sending module 504 may be configured to perform the step of sending the first index file of the target media asset medium in S203, and the storage module 501 may be configured to perform the step of updating a media asset library based on the second index file in S208.

Optionally, the sending module 503 is further configured to inject the second index file into a content delivery network CDN subsystem based on identification information of the target video. The CDN subsystem is configured to store the first index file, and the second index file is used by the CDN subsystem to update the first index file. For example, with reference to FIG. 3, the sending module 503 may be configured to perform the step of injecting the second index file of the target media asset medium into a CDN subsystem based on the identification information of the target video in S107. For example, with reference to FIG. 4, the sending module 503 may be configured to perform the step of injecting the second index file of the target media asset medium into a CDN subsystem based on the identification information of the target video in S209.

Optionally, the sending module 503 is further configured to inject the medium file corresponding to the second bitstream into the CDN subsystem based on the identification information of the target video. For example, with reference to FIG. 3, the sending module 503 may be configured to perform the step of injecting the medium file corresponding to the second bitstream into a CDN subsystem based on the identification information of the target video in S107. For example, with reference to FIG. 4, the sending module 503 may be configured to perform the step of injecting the medium file corresponding to the second bitstream into a CDN subsystem based on the identification information of the target video in S209.

Optionally, the sending module 503 is further configured to send an update amount of the target media asset medium information to a content management subsystem. The update amount of the target media asset medium information is used by the content management subsystem to update metadata information of the target video. For example, with reference to FIG. 3, the sending module 503 may be configured to perform S110. For example, with reference to FIG. 4, the sending module 503 may be configured to perform S212.

For explanations of related content, descriptions of beneficial effects, and the like in any apparatus 500 provided above, refer to the foregoing corresponding method embodiment. Details are not described herein again.

Figure 6:
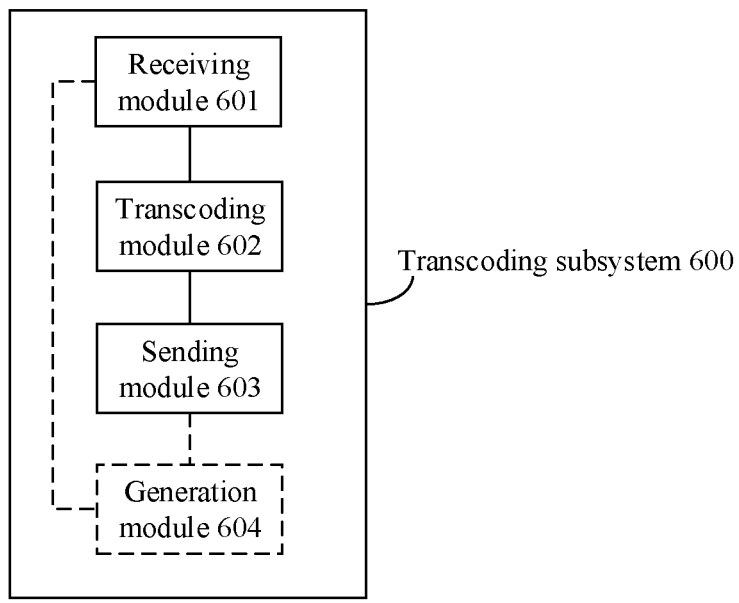
FIG. 6 is a schematic block diagram of a transcoding subsystem according to an embodiment of this disclosure.

FIG. 6 is a schematic block diagram of a transcoding subsystem 600 according to an embodiment of this disclosure. The transcoding subsystem 600 may be configured to perform any video transcoding method provided in the embodiments of this disclosure, for example, the video transcoding method shown in FIG. 3 or FIG. 4.

The transcoding subsystem 600 may include a receiving module 601, a transcoding module 602, and a sending module 603. For example, the receiving module 601 is configured to receive a content source film that is of a target video and that is sent by a media asset subsystem. The transcoding module 602 is configured to transcode the content source film of the target video into a medium file corresponding to a second bitstream, where first information of the second bitstream is the same as first information of the first bitstream, and the first information includes location information of a key frame and whether the key frame is an IDR frame. The sending module 603 is configured to send the medium file corresponding to the second bitstream to the media asset subsystem. For example, with reference to FIG. 3, the transcoding module 602 is configured to perform the step of transcoding the content source film of the target video into a medium file corresponding to a second bitstream in S104, and the sending module 603 is configured to perform the step of sending the medium file corresponding to the second bitstream in S105. For example, with reference to FIG. 4, the transcoding module 602 is configured to perform the step of transcoding the content source film of the target video into a medium file corresponding to a second bitstream in S206, and the sending module 603 is configured to perform the step of sending the medium file corresponding to the second bitstream in S207.

Optionally, the first information further includes at least one of GOP description information, fragment description information, and segment description information.

Optionally, the receiving module 601 is further configured to receive the first information that is of the first bitstream and that is sent by the media asset subsystem.

Optionally, the receiving module 601 is further configured to receive the medium file that corresponds to the first bitstream and that is sent by the media asset subsystem; and the transcoding subsystem 600 further includes a generation module 604, configured to generate the first information of the first bitstream based on the medium file corresponding to the first bitstream. For example, with reference to FIG. 4, the generation module 604 is configured to perform S204.

Optionally, the sending module 603 is further configured to send the first information of the first bitstream to the media asset subsystem. For example, with reference to FIG. 4, the sending module 603 may be configured to perform S205.

Optionally, the generation module 604 is further configured to generate second information of the second bitstream; and the sending module 603 is further configured to send the second information of the second bitstream to the media asset subsystem. The second information of the second bitstream is used by the media asset subsystem to update a first index file of the target media asset medium to obtain a second index file of the target media asset medium, the first index file includes second information of the first bitstream, and the second index file includes second information of the first bitstream and the second information of the second bitstream.

Optionally, the receiving module 601 is further configured to receive a first index file that is of the target media asset medium and that is sent by the media asset subsystem, where the first index file includes second information of the first bitstream; the generation module 604 is further configured to generate second information of the second bitstream; and the sending module 603 is further configured to send the second index file to the media asset subsystem. The second index file is used by the media asset subsystem to replace the first index file. For example, with reference to FIG. 3, the generation module 604 may be configured to perform the step of generating second information of the second bitstream, and adding the second information of the second bitstream to the first index file, to obtain the second index file in S104, and the sending module 603 may be configured to perform the step of sending the second index file of the target media asset medium in S105. For example, with reference to FIG. 4, the generation module 604 may be configured to perform the step of generating second information of the second bitstream, and adding the second information of the second bitstream to the first index file, to obtain the second index file in S206, and the sending module 603 may be configured to perform the step of sending the second index file of the target media asset medium in S207.

For explanations of related content, descriptions of beneficial effects, and the like in any sequence configuration apparatus 600 provided above, refer to the foregoing corresponding method embodiments. Details are not described herein again.

Figure 7:
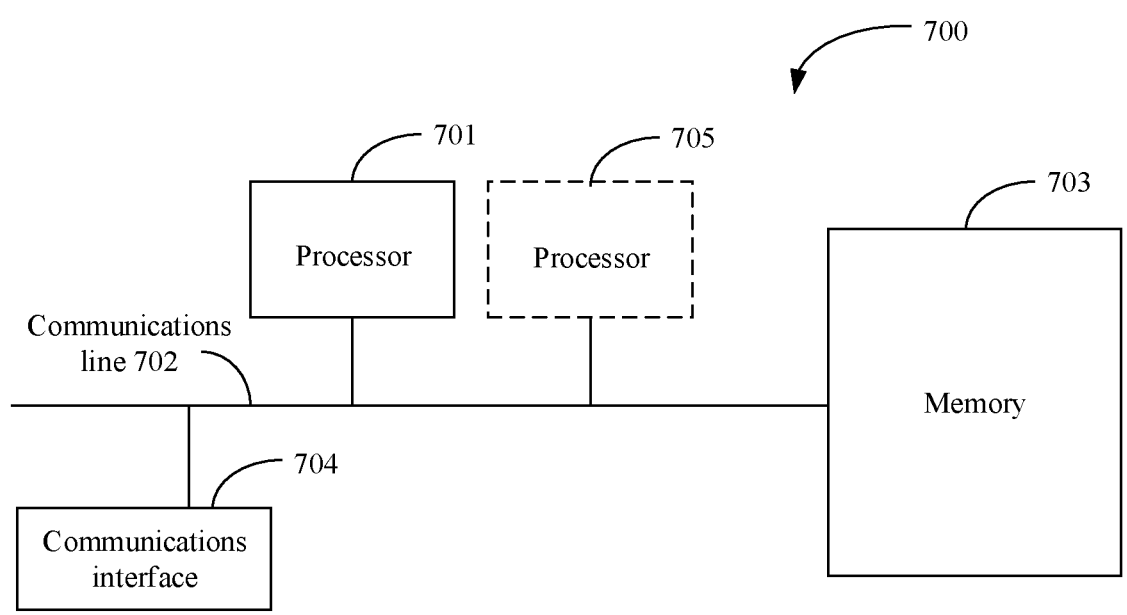
FIG. 7 is a schematic diagram of a hardware structure of a communications device according to an embodiment of this disclosure.

FIG. 7 is a schematic block diagram of a hardware structure of a communications device 700 according to an embodiment of this disclosure, which may be configured to implement a device in any subsystem (such as the media asset subsystem, the transcoding subsystem, the CDN subsystem, and the content management subsystem) in the video transcoding system. The communications device 700 includes at least one processor 701, a communications line 702, a memory 703, and at least one communications interface 704.

The processor 701 may be a general-purpose central processing unit (CPU), a microprocessor, an application-specific integrated circuit (ASIC), or one or more integrated circuits configured to control program execution in the solutions of this disclosure.

The communications line 702 may include a channel for transferring information between the components (for example, the at least one processor 701, the communications line 702, the memory 703, and the at least one communications interface 704).

The communication interface 704 uses any transceiver-like apparatus to communicate with another device or communications network, such as a wide area network (wide area network, WAN) or local area network (local area network, LAN).

The memory 703 may be a read-only memory (read-only memory, ROM) or another type of static storage device that can store static information and a static instruction; or a random access memory (random access memory, RAM) or another type of dynamic storage device that can store information and an instruction; or may be an electrically erasable programmable read-only memory (Electrically Erasable Programmable Read-Only Memory, EEPROM), a compact disc read-only memory (Compact Disc Read-Only Memory, CD-ROM) or another compact disc storage medium, optical disc storage medium (including a compact disc, a laser disc, an optical disc, a digital versatile disc, a Blu-ray disc, or the like) and magnetic disk storage medium, another magnetic storage device, or any other medium that can be configured to carry or store expected program code in a form of an instruction or a data structure and that is accessible by a computer, but is not limited thereto. The memory may exist independently and is connected to the processor with the communication line 702. Alternatively, the memory 703 may be integrated with the processor 701. The memory provided in this embodiment of this disclosure may be usually non-volatile. The memory 703 is configured to store a computer-executable instruction for executing the solutions of this disclosure, and the processor 701 controls the execution. The processor 701 is configured to execute the computer-executable instruction stored in the memory 203, to implement methods provided in the following embodiments of this disclosure.

During specific implementation, in an embodiment, the communications device 700 may include a plurality of processors, for example, the processor 701 and a processor 705 in FIG. 7. Each of the processors may be a single-core (single-CPU) processor, or may be a multi-core (multi-CPU) processor. The processor herein may be one or more devices, circuits, and/or processing cores for processing data (for example, computer program instructions).

In an example, with reference to the communications device shown in FIG. 7, the obtaining module 503 and the generation module 505 of the media asset subsystem 500 may be implemented by using the processor 701 or the processor 705 in FIG. 7. The receiving module 502 and the sending module 504 may be implemented by using the communications interface 704 in FIG. 7. The storage module 501 may be implemented by using the memory 703 in FIG. 7.

In an example, with reference to the communications device shown in FIG. 7, the transcoding module 602 and the generation module 604 of the transcoding subsystem 600 may be implemented by using the processor 701 or the processor 705 in FIG. 7. The receiving module 601 and the sending module 603 may be implemented by using the communications interface 704 in FIG. 7.

An embodiment of this disclosure provides a video transcoding system. The video transcoding system includes any media asset subsystem 500 above and any transcoding subsystem 600 above.

An embodiment of this disclosure provides an interface between a media asset subsystem 500 and a transcoding subsystem 600. The interface may be a physical interface or a logical interface. The interface is configured to transmit at least one of the first index file of the target media asset medium and the first information of the target media asset medium in S103, and the medium file corresponding to the second bitstream in S105 in the embodiment of FIG. 3 in this disclosure; and at least one of the first index file of the target media asset medium and the medium file corresponding to the first bitstream in S203, the first information of the target media asset medium in S205, and the medium file corresponding to the second bitstream in S207 in the embodiment of FIG. 4 in this disclosure.

A person of ordinary skill in the art may understand that all or some of the steps of the foregoing embodiments may be implemented by a program instructing related hardware. The program may be stored in a computer-readable storage medium. The storage medium mentioned above may be a read-only memory, a random access memory, or the like.

The processing unit or the processor may be a central processing unit, a general purpose processor, an application-specific integrated circuit (ASIC), a microprocessor (digital signal processor, DSP), a field programmable gate array (FPGA) or another programmable logic device, a transistor logic device, a hardware component, or any combination thereof.

An embodiment of this disclosure further provides a computer program product including an instruction. When the computer program product is run on a computer, the computer is enabled to perform any method in the foregoing embodiments. The computer program product includes one or more computer instructions. When the computer program instructions are loaded and executed on a computer, the procedure or functions according to the embodiments of this disclosure are completely or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

It should be noted that, the foregoing devices that are provided in the embodiments of this disclosure and that are configured to store the computer instruction or the computer program, for example but not limited to, the foregoing memory, computer-readable storage medium, and communications chip, are all non-transitory.

In a process of implementing this disclosure that claims protection, a person skilled in the art may understand and implement other variations of the disclosed embodiments by viewing the accompanying drawings, the disclosed content, and the accompanying claims. In the claims, "comprising" does not exclude another component or another step, and "a" or "one" does not exclude a meaning of plurality. A single processor or another unit may implement several functions enumerated in the claims. Some measures are recorded in dependent claims that are different from each other, but this does not mean that these measures cannot be combined to produce a better effect.

Although this disclosure is described with reference to specific features and the embodiments thereof, various modifications and combinations may be made to them without departing from the spirit and scope of this disclosure. Correspondingly, the specification and accompanying drawings are merely example descriptions of this disclosure defined by the appended claims, and are considered as any or all of modifications, variations, combinations, or equivalents that cover the scope of this disclosure.

What is claimed is:

1. A video transcoding method, applied to a media asset subsystem and a transcoding subsystem, wherein the media asset subsystem stores a target media asset medium of a target video, and the target media asset medium comprises a medium file corresponding to a first bitstream; and the method comprises:
   receiving, by the media asset subsystem, an indication message, wherein the indication message indicates to add a medium file corresponding to a second bitstream to the target media asset medium;
   obtaining, by the media asset subsystem, a source video of the target video and a first index file of the target media asset medium, based on the indication message, wherein the first index file comprises second information of the first bitstream;
   sending, by the media asset subsystem, the source video of the target video to a transcoding subsystem;
   generating, by the transcoding subsystem, and using the source video of the target video, a medium file and first information both corresponding to the second bitstream, the first information of the second bitstream being the same as first information of the first bitstream stored in the media asset subsystem, and the first information comprises location information of a key frame and indicates whether the key frame is an instantaneous decoder refresh (IDR) frame;
   receiving, by the media asset subsystem from the transcoding subsystem, the medium file that corresponds to the second bitstream;
   obtaining, by the media asset subsystem, a second index file of the target media asset medium, the second index file comprising second information of the second bitstream, wherein the second information is information used to describe a feature of the bitstream,
   wherein the second information is information describing a feature of the bitstream.

2. The method according to claim 1, wherein the first information further comprises at least one of group of pictures (GOP) description information, fragment description information, and segment description information.

3. The method according to claim 1, wherein the method further comprises:
   obtaining, by the media asset subsystem, the first information of the first bitstream based on the indication message; and
   sending, by the media asset subsystem, the first information of the first bitstream to the transcoding subsystem.

4. The method according to claim 1, wherein the method further comprises:
   obtaining, by the media asset subsystem, the medium file corresponding to the first bitstream based on the indication message; and
   sending, by the media asset subsystem, the medium file corresponding to the first bitstream to the transcoding subsystem;
   generating, by the transcoding subsystem, the first information of the first bitstream using the medium file corresponding to the first bitstream.

5. The method according to claim 4, wherein the method further comprises:
   receiving, by the media asset subsystem, the first information that is of the first bitstream and that is sent by the transcoding subsystem, and storing the first information of the first bitstream.

6. The method according to claim 1, wherein the obtaining, by the transcoding subsystem, using the first index file, the second index file of the target media asset medium comprises:

receiving, by the media asset subsystem from the transcoding subsystem, second information of the second bitstream; and adding, by the media asset subsystem, the second information of the second bitstream to the first index file, to obtain the second index file of the target media asset medium.

7. The method according to claim 1, wherein the obtaining, by the transcoding subsystem, using the first index file, the second index file of the target media asset medium comprises:

sending, by the media asset subsystem, the first index file to the transcoding subsystem;

obtaining, by the transcoding subsystem, using the first index file, the second index file of the target media asset medium, and the second index file comprises the second information of the first bitstream and second information of the second bitstream;

receiving, by the media asset subsystem, the second index file from the transcoding subsystem; and replacing, by the media asset subsystem, the first index file with the second index file.

8. The method according to claim 6, further comprising:

injecting, by the media asset subsystem, the second index file into a content delivery network (CDN) subsystem based on identification information of the target video, wherein the CDN subsystem stores the first index file.

9. The method according to claim 1, wherein after the receiving, by the media asset subsystem from the transcoding subsystem, the medium file that corresponds to the second bitstream, the method further comprises:

injecting, by the media asset subsystem, the medium file corresponding to the second bitstream into the CDN subsystem based on the identification information of the target video.

10. The method according to claim 1, wherein the method further comprises:

sending, by the media asset subsystem, an update of the target media asset medium information to a content management subsystem.

11. A video transcoding method, applied to a transcoding subsystem, wherein the method comprises:

receiving, by the transcoding subsystem, a source video of a target video and a first index file of a target media asset medium, from the media asset subsystem, wherein the first index file comprises second information of a first bitstream;

transcoding, by the transcoding subsystem, the source video into a medium file corresponding to a second bitstream;

generating, by the transcoding subsystem, first information of the second bitstream, wherein first information of the second bitstream is the same as first information of the first bitstream stored in the transcoding subsystem, and the first information comprises location information of a key frame and whether the key frame is an instantaneous decoder refresh IDR frame;

generating, by the transcoding subsystem, second information of the second bitstream, and adding the second information of the second bitstream to the first index file, to obtain a second index file, wherein the second information describes a feature of the bitstream; and sending, by the transcoding subsystem, the medium file corresponding to the second bitstream and the second index file to the media asset subsystem.

12. The method according to claim 11, wherein the first information further comprises at least one of group of pictures (GOP) description information, fragment description information, and segment description information.

13. The method according to claim 11, wherein the method further comprises:

receiving, by the transcoding subsystem, the first information of the first bitstream from the media asset subsystem.

14. The method according to claim 11, wherein the method further comprises:

receiving, by the transcoding subsystem, the medium file corresponding to the first bitstream from the media asset subsystem; and generating, by the transcoding subsystem, the first information of the first bitstream based on the medium file corresponding to the first bitstream.

15. The method according to claim 14, wherein the method further comprises:

sending, by the transcoding subsystem, the first information of the first bitstream to the media asset subsystem.

16. The method according to claim 11, wherein the method further comprises:

sending the second information of the second bitstream to the media asset subsystem.

17. A media asset and transcoding subsystem, wherein the media asset and transcoding subsystem comprises:

a storage module of a media asset subsystem, configured to store a target media asset medium of a target video, wherein the target media asset medium comprises a medium file of a first bitstream;

a receiving module of the media asset subsystem, configured to receive an indication message, wherein the indication message indicates to add a medium file corresponding to a second bitstream to the target media asset medium;

an obtaining module of the media asset subsystem, configured to obtain a source video of the target video and an index file, based on the indication message, wherein the first index file comprises second information of the first bitstream; and a sending module of the media asset subsystem, configured to send the source video of the target video to a transcoding subsystem;

a transcoding subsystem, configured to generate, using the source video of the target video, a medium file and first information both corresponding to the second bitstream, the first information of the second bitstream being the same as first information of the first bitstream stored in the media asset subsystem, and the first information comprises location information of a key frame and indicates whether the key frame is an instantaneous decoder refresh IDR frame; and the receiving module is further configured to receive from the transcoding subsystem the medium file corresponding to the second bitstream; and either of:

the receiving module is further configured to receive second information of the second bitstream and from the transcoding subsystem; and the media asset subsystem further comprises:

a generation module, configured to add the second information of the second bitstream to the first index file, to obtain a second index file of the target media asset medium, wherein the second information is information describing a feature of the bitstream; or the sending module is further configured to send the first index file to the transcoding subsystem, using the first index file, a second index file of the target media asset medium, and the second index file comprises the second information of the first bitstream and second information of the second bitstream, wherein the second information is information describing a feature of the bitstream;

the receiving module is further configured to receive the second index file from the transcoding subsystem; and the storage module is further configured to replace the first index file with the second index file.

18. The media asset subsystem according to claim 17, wherein the first information further comprises at least one of group of pictures (GOP) description information, fragment description information, and segment description information.

19. The media asset subsystem according to claim 17, wherein the obtaining module is further configured to obtain the first information of the first bitstream based on the indication message; and the sending module is further configured to generate the first information of the first bitstream using the medium file corresponding to the first bitstream.

20. The media asset subsystem according to claim 17, wherein the obtaining module is further configured to obtain the medium file corresponding to the first bitstream based on the indication message; and the sending module is further configured to send the medium file corresponding to the first bitstream to the transcoding subsystem and generate the first information of the first bitstream using the medium file corresponding to the first bitstream.

21. The media asset subsystem according to claim 17, wherein the receiving module is further configured to receive the first information that is of the first bitstream and that is sent by the transcoding subsystem; and the storage module is further configured to store the first information of the first bitstream.

22. The media asset subsystem according to claim 17, wherein the receiving module is further configured to receive second information of the second bitstream and from the transcoding subsystem; and the media asset subsystem further comprises:

the generation module, configured to add the second information of the second bitstream to the first index file, to obtain the second index file of the target media asset medium, wherein the second information is information describing the feature of the bitstream.

23. The media asset subsystem according to claim 17, wherein the sending module is further configured to send the first index file to the transcoding subsystem, using the first index file, the second index file of the target media asset medium, and the second index file comprises the second information of the first bitstream and second information of the second bitstream, wherein the second information is information used to describing the feature of the bitstream;

the receiving module is further configured to receive the second index file from the transcoding subsystem; and the storage module is further configured to replace the first index file with the second index file.

24. The system according to claim 17, wherein the sending module is further configured to inject the second index file into a content delivery network (CDN) subsystem based on identification information of the target video, wherein the CDN subsystem is configured to store the first index file.

25. The media asset subsystem according to claim 17, wherein the sending module is further configured to inject the medium file corresponding to the second bitstream into the CDN subsystem based on the identification information of the target video.

26. The media asset subsystem according to claim 17, wherein the sending module is further configured to send an update of the target media asset medium information to a content management subsystem.

* * * * *